(12) United States Patent
Teoh

(10) Patent No.: US 8,453,087 B2
(45) Date of Patent: May 28, 2013

(54) METHOD AND APPARATUS FOR PREEMPTIVE DESIGN VERIFICATION VIA PARTIAL PATTERN MATCHING

(75) Inventor: Kah Ching Edward Teoh, Singapore (SG)

(73) Assignee: GLOBALFOUNDRIES Singapore Pte. Ltd., Singapore (SG)

( * ) Notice: Subject to any disclaimer, the term of this patent is extended or adjusted under 35 U.S.C. 154(b) by 0 days.

(21) Appl. No.: 13/193,961

(22) Filed: Jul. 29, 2011

(65) Prior Publication Data

US 2013/0031521 A1   Jan. 31, 2013

(51) Int. Cl.
*G06F 17/50*   (2006.01)

(52) U.S. Cl.
USPC ........................................................ 716/110

(58) Field of Classification Search
USPC .................................................. 716/100, 110
See application file for complete search history.

(56) References Cited

U.S. PATENT DOCUMENTS

| 7,657,852 | B2 * | 2/2010 | Waller ........................ 716/119 |
| 2007/0044060 | A1 * | 2/2007 | Waller .......................... 716/13 |
| 2008/0310702 | A1 * | 12/2008 | Taguchi et al. ............... 382/141 |
| 2010/0122227 | A1 * | 5/2010 | Waller ............................ 716/5 |
| 2010/0185994 | A1 * | 7/2010 | Pikus et al. ...................... 716/5 |
| 2012/0191729 | A1 * | 7/2012 | Simmons et al. ............. 707/752 |

* cited by examiner

*Primary Examiner* — Suchin Parihar
(74) *Attorney, Agent, or Firm* — Ditthavong Mori & Steiner, P.C.

(57) ABSTRACT

An approach is provided for preemptive design verification via partial pattern matching. Data corresponding to one or more problematic layout patterns associated with an integrated circuit manufacturing process is received. Data corresponding to a block of intellectual property including a layout design is received. At least a boundary of the layout design is scanned against the one or more problematic layout patterns. One or more partial matches of the one or more problematic layout patterns are identified at least at the boundary. Results are generated indicating the one or more partial matches.

16 Claims, 19 Drawing Sheets

METHOD AND APPARATUS FOR PREEMPTIVE DESIGN VERIFICATION VIA PARTIAL PATTERN MATCHING

TECHNICAL FIELD

The present disclosure relates to technology for implementing electronic design automation tools, and in particular, to electronic design automation tools for preemptive design verification via partial pattern matching.

BACKGROUND

Manufacturability-aware physical integrated circuit (IC) design processes, which take into account such factors as yield and reliability, are becoming increasingly important aspects in bridging the gap between what is designed and what is actually produced or fabricated. This disconnect between design and production is often attributable to physical layout patterns (or configurations), also referred to herein as problematic layout patterns, being susceptible to various processing issues related to the manufacturing processes being employed. For instance, ICs are often fabricated using one or more deposition-based, modification-based (e.g., doping, implantation, etc.), patterning-based (e.g., lithography), removal-based (e.g., etching, planarization, etc.), and the like processing steps prone to various processing fluctuations, such as bridging, necking, notching, pinching, stressing, and the like issues, as well as other parametric design marginalities. These manufacturing issues are often the result of attempts to fabricate at least one problematic layout pattern. It is, therefore, desirable to be able to identify and remove these problematic layout patterns, as well as to replace them with more reliable, yield-friendly configurations.

Traditionally, physical IC design verification has focused primarily on design verification rules-based approaches. For example, design rule checking (DRC) is an area of electronic design automation (EDA) that enables IC designers to determine whether a particular physical layout design satisfies a series of parameters, also referred to as design rules. Design rules are typically provided by IC manufacturers (e.g., foundries) to enable IC designers to verify the "correctness" of their physical layout patterns. In this manner, design rules are often associated with specific manufacturing processes. Thus, a set of design rules may specify certain IC feature (e.g., geometric element) and/or connectivity restrictions to ensure sufficient margins are present to account for the variability in one or more manufacturing processes. As such, design rule checking is a major step during physical verification of physical IC layout configurations, which may also involve one or more antenna checks, electrical rule checks (ERC), exclusive or (XOR) checks, layout versus schematic (LVS) checks, etc.

As the demand for increased feature densities grows and manufacturing processes evolve, design rule sets are becoming increasingly more complex. Accordingly, one objective of design verification is to achieve a certain level of yield and reliability for a particular physical IC layout pattern. If design rules are violated the design may not be functional. To meet this goal of improving yield and/or reliability, design verification has evolved from simple measurement and Boolean check-based techniques to processes that modify existing features, insert new features, and check entire designs for process limitations. A completed layout consists not only of the geometric representation of the design itself, but also data that provides support for manufacturing the design. While design verification processes do not necessarily ensure a particular physical IC layout pattern will operate correctly, these processes are constructed to at least verify that the physical configuration meets certain processing constraints for given design types and/or manufacturing process technologies. As such, design verification tools usually receive physical IC layout patterns (or designs) in one or more standardized formats, and produce results (e.g., reports) of any design verification violations that an IC designer may or may not choose to correct based on the application of one or more design verification rules against the received designs. Strategically waiving certain design verification rules is often utilized to increase IC performance and density, but generally at the expense of yield and/or reliability.

Thus, as physical IC layout patterns become more complex, the execution of design verification techniques is becoming evermore computationally intensive. For instance, some design verification techniques, if executed on a single processing platform, may require several days (if not weeks) to generate results. In competitive environments like the semiconductor industry, however, design cycles need to be as short as possible; lengthy design verification processes only burden such efforts.

Moreover, satisfaction of one particular set of design verification rules may not be adequate when the design verification rules are affected by the complexity of the layout pattern containing a particular feature or rule. One particular design verification rule may be adequate for certain particular physical IC layout patterns, but may require modification when applied against another physical IC layout pattern. For example, DRC processes may be performed by checking the physical properties of one or more "as-designed" geometric elements included as part of a physical IC layout pattern (or design) against one or more permissible design verification rules, such as rules regarding area, grid, length, size, spacing, corner, enclosure, intersection, overlap, and/or the like. As such, DRC is becoming the industry standard for constraining designs to ensure adequate physical and electrical manufacturability. However, as technology processes continue to shrink and aggressive resolution enhancement technologies (RET), optical proximity corrections (OPC), laser trimming, and/or other corrective manufacturing processes are applied, physical IC layout patterns verified by conventional verification techniques may still be difficult to manufacture. There have been attempts to resolve the inconsistencies of conventional design verification approaches, such as through the application of additional rules to identify specific problematic cases, but due to the lack of specificity with design verification itself, these efforts have been met with mixed-success. Even though these alternative approaches may resolve existing issues, often, the enforcement of some design verification rules causes other problematic layout patterns to occur as IC designers attempt to satisfy all the constraints imposed upon their designs.

Design verification plus, such as DRC-Plus, adopts a different approach to rectifying the inconsistencies of conventional DRC approaches. For instance, DRC-Plus may augment conventional design verification approaches with one or more multi-dimensional pattern matching techniques capable of identifying problematic layout patterns predetermined to be difficult to manufacture. In this manner, design verification plus tools may also be configured to return specific feedback to IC designers on how to resolve one or more identified issues. This approach offers several advantages over other manufacturability-aware techniques, such as being quickly and efficiently enforceable and providing pass/no-pass criteria. It also provides simple documentation within design manuals, it is not as computationally intensive as rules-based or simulation-based approaches, and it does not require highly-accurate manufacturability models, such as lithographic or other manufacturing-based models, that may not be available during design verification processes. These advantages enable design verification plus approaches to be applied early in the design flow, as well as enforced in conjunction with other conventional design verification techniques, if desired.

Another issue as physical IC layout patterns become more complex involves the increased reliance on "off-the-shelf" physical IC block layout patterns (hereinafter referred to as physical block designs) that are preconfigured to achieve one or more particular purposes. While these physical block designs are, in effect, being utilized as modular components capable of integration as part of other IC designs, such as full system on chip (SoC) designs, the routing and placement of these modular components is proving to be difficult. Since these physical block designs may be randomly placed and routed in juxtaposition with one or more other physical IC layout patterns, the risk of creating at least one problematic layout pattern increases once one or more geometric elements of a modular physical block design are randomly placed and routed in relative proximity to one or more other geometric elements of another IC design. This creates a gap between the time when the physical block is designed and the time when the physical block design is incorporated as part of another design. Conventional design verification and design verification plus approaches, however, act upon actually present physical layout patterns and, therefore, are unable to predict, identify, and handle "potentially" problematic layout patterns included as part of a physical block design that may result in "actual" problematic layout patterns once the physical block design is integrated as part of another IC design.

A need, therefore, exists for methodology enabling efficient, preemptive design verification tools capable of identifying and handling potentially problematic layout patterns that may result in actual problematic layout patterns once a physical block design is incorporated as part of another IC design, such as a full SoC design. There exists a particular need for methodology enabling identification of potentially problematic layout patterns via multi-dimensional pattern matching technology.

SUMMARY

An aspect of the present disclosure is a method for identifying potentially problematic layout patterns utilizing multi-dimensional pattern matching technology.

Another aspect of the present disclosure is an apparatus for identifying potentially problematic layout patterns utilizing multi-dimensional pattern matching technology.

Yet another aspect of the present disclosure is a method for identifying and handling problematic layout patterns utilizing multi-dimensional pattern matching technology.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: receiving data corresponding to one or more problematic layout patterns associated with an integrated circuit manufacturing process; receiving data corresponding to a block of intellectual property including a layout design; scanning at least a boundary of the layout design against the one or more problematic layout patterns; identifying, at least at the boundary, one or more partial matches of the one or more problematic layout patterns; and generating results indicating the one or more partial matches.

Aspects of the present disclosure include modifying the layout design based on the results. Another aspect includes modifying the layout design to include at least one localized blockage around at least a portion of at least one of the one or more partial matches. Other aspects include modifying the layout design to remove at least one of the one or more partial matches. Additional aspects include wherein the block including the modified layout design is configured as a modular component for integration as part of another integrated circuit design. Further aspects include identifying the one or more partial matches based on at least one pattern matching sensitivity parameter. Other aspects include wherein the one or more problematic layout patterns are associated with at least one yield and/or reliability detracting issue. Another aspect includes wherein the integrated circuit manufacturing process includes at least one deposition-based, modification-based, patterning-based, or removal-based manufacturing process. An additional aspect includes wherein the integrated circuit manufacturing process includes photolithography and the layout design is utilized to fabricate a photolithographic mask.

Another aspect of the present disclosure is an apparatus including: at least one processor; and at least one memory including computer program code, the at least one memory and the computer program code configured to, with the at least one processor, cause the apparatus to perform at least the following, receive data corresponding to one or more problematic layout patterns associated with an integrated circuit manufacturing process, receive data corresponding to a block of intellectual property including a layout design, scan at least a boundary of the layout design against the one or more problematic layout patterns, identify, at least at the boundary, one or more partial matches of the one or more problematic layout patterns, and generate results indicating the one or more partial matches.

Aspects of the present disclosure include wherein the apparatus is at least further caused to: modify the layout design based on the results. Another aspect includes wherein modifying the layout design at least includes: modifying the layout design to include at least one localized blockage around at least a portion of at least one of the one or more partial matches. Other aspects include wherein modifying the layout design at least includes: modifying the layout design to remove at least one of the one or more partial matches. Additional aspects include wherein the block including the modified layout design is configured as a modular component for integration as part of another integrated circuit design. Further aspects include wherein the apparatus is at least further caused to: identify the one or more partial matches based on at least one pattern matching sensitivity parameter. Other aspects include wherein the one or more problematic layout patterns are associated with at least one yield and/or reliability detracting issue. Another aspect includes wherein the integrated circuit manufacturing process includes at least one deposition-based, modification-based, patterning-based, or removal-based manufacturing process. An additional aspect includes wherein the integrated circuit manufacturing process includes photolithography and the layout design is utilized to fabricate a photolithographic mask.

Another aspect of the present disclosure is a method including: receiving data corresponding to one or more problematic layout patterns associated with an integrated circuit (IC) manufacturing process; receiving data corresponding to a block of intellectual property including a layout design; scanning at least a boundary of the layout design against the one or more problematic layout patterns to identify if there are any at least partial matches of the one or more problematic layout patterns at least at the boundary; generating results to indicate whether at least one or more partial matches exist; generating an output layout design; forming an IC design including the output layout design; fabricating a photolithographic mask patterned with the IC design; and patterning an IC chip using the photolithographic mask.

Aspects of the present disclosure include generating an output layout design by modifying the layout design to either include at least one localized blockage around at least a portion of at least one of the one or more partial matches or remove at least one of the one or more partial matches.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

Figure 1:
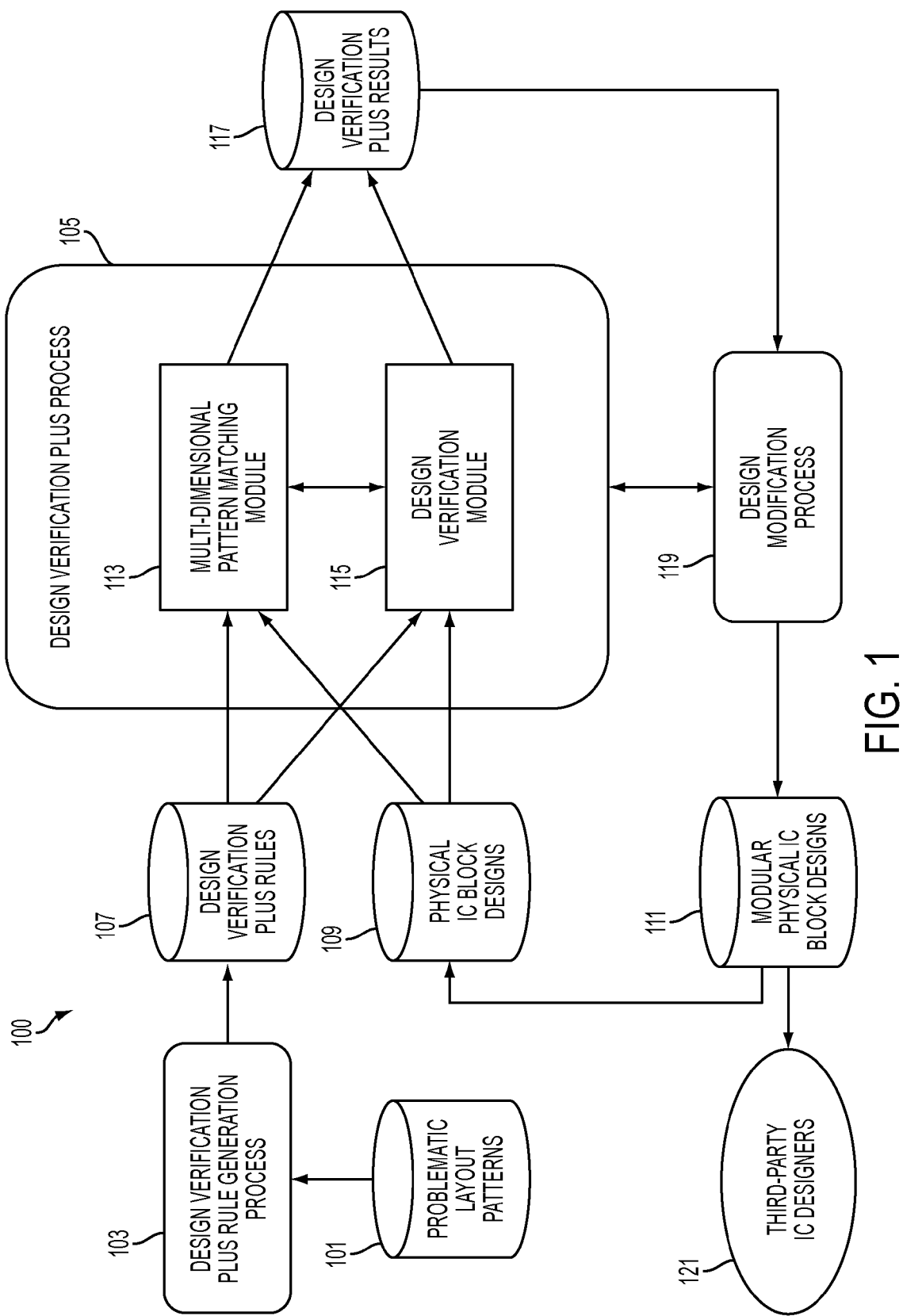
FIG. 1 schematically illustrates an overall process flow for identifying and handling potentially problematic layout patterns exhibited within a physical integrated circuit block design, according to an exemplary embodiment.

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

The present disclosure addresses and solves a problem of increasing time and resources being spent predicting, identifying, and handling potentially problematic layout patterns associated with physical IC block designs that are configured as modular components and, thereby, capable of being integrated as part of one or more other IC designs, such as full SoC designs. In accordance with embodiments of the present disclosure, potential problematic layout patterns are identified at physical IC block design boundaries by identifying partial matches with known problematic layout patterns. The potential problematic layout patterns may then be removed or placed in juxtaposition with (e.g., surrounded by) a localized routing blockage to prevent the actual problematic layout pattern from arising.

Methodology in accordance with embodiments of the present disclosure, includes: receiving data corresponding to one or more problematic layout patterns associated with an integrated circuit manufacturing process, receiving data corresponding to a block of intellectual property including a layout design, scanning at least a boundary of the layout design against the one or more problematic layout patterns, identifying, at least at the boundary, one or more partial matches of the one or more problematic layout patterns, and generating results indicating the one or more partial matches.

Still other aspects, features, and technical effects will be readily apparent to those skilled in this art from the following detailed description, wherein preferred embodiments are shown and described, simply by way of illustration of the best mode contemplated. The disclosure is capable of other and different embodiments, and its several details are capable of modifications in various obvious respects. Accordingly, the drawings and description are to be regarded as illustrative in nature, and not as restrictive.

In order to improve the manufacturability of physical IC block layout patterns, "potentially" problematic layout patterns are identified and handled in one or more automated processes. According to exemplary embodiments, identification of potentially problematic layout patterns may be effectuated via one or more multi-dimensional pattern matching techniques, which may be additionally verified against one or more conventional design verification rules. Generally, an "actual" problematic layout pattern refers to a physical IC layout pattern (or design) and, thereby, the one or more geometric elements included as part of the physical IC design that, when fabricated utilizing one or more manufacturing processes, result in at least one manufactured hotspot, e.g., one or more yield and/or reliability detracting features or issues, such as bridging, necking, notching, pinching, line-end shorting, stressing and/or the like. A "potentially" problematic layout pattern refers to a physical IC layout pattern and, thereby, the one or more geometric elements included as part of the physical IC design that, when randomly juxtaposed with or integrated as part of one or more other physical IC layout patterns, have a sufficient likelihood of resulting in a configuration of geometric elements exhibiting at least one "actual" problematic layout pattern. This sufficient likelihood of occurrence warrants preemptive redesign and/or replacement of one or more geometric elements included as part of the physical IC layout pattern exhibiting the potentially problematic layout pattern. The potentially problematic layout pattern is either removed or at least a portion of the potentially problematic layout pattern is formed with (or in juxtaposition with) a localized blockage, i.e., a localized area around or near at least a portion of the potentially problematic layout pattern where routing and/or placement resources are either reduced or unavailable. Generally, if no routing and/or placement resources are available across or within the blockage, then the blockage is considered complete; otherwise, the blockage is considered partial. The identification of one or more potentially problematic layout patterns may be considered as the identification of one or more partial matches corresponding to related actual problematic layout patterns.

FIG. 1 schematically illustrates an overall process flow for identifying and handling potentially problematic layout patterns exhibited within a physical integrated circuit block design, according to an exemplary embodiment. Process flow 100 may be associated with at least one manufacturing process and, thereby, at least one IC manufacturer. In this manner, the IC manufacturer (or foundry) may provide an IC designer with one or more predefined actual problematic layout patterns, which may be stored to, for example, problematic layout patterns repository 101. As previously described, these actual problematic layout patterns are to be avoided when designing a physical IC layout pattern, as these actual problematic layout patterns result in at least one manufactured hotspot when fabricated via the at least one manufacturing process, such as a deposition-based, modification-based, patterning-based, removal-based, etc. manufacturing process. The IC manufacturer may provide the actual problematic layout patterns as part of a manual, as user interface input, or as foundry output from one or more design verification tools. In this manner, the actual problematic layout patterns may be further associated with one or more conventional design verification rules, such as one more parameters (or constraints) governing geometric element area, grid, length, size, spacing, corner, enclosure, intersection, and overlap. As such, the actual problematic layout patterns may be stored to repository 101 in association with corresponding conventional design verification rules. It is also noted that the actual problematic layout patterns may be manufacturer and/or manufacturing process specific and, therefore, actual problematic layout patterns may be stored to repository 101 in association with corresponding manufacturers and manufacturing processes. An exemplary actual problematic layout pattern is described in more detail in association with FIG. 2.

Figure 2:
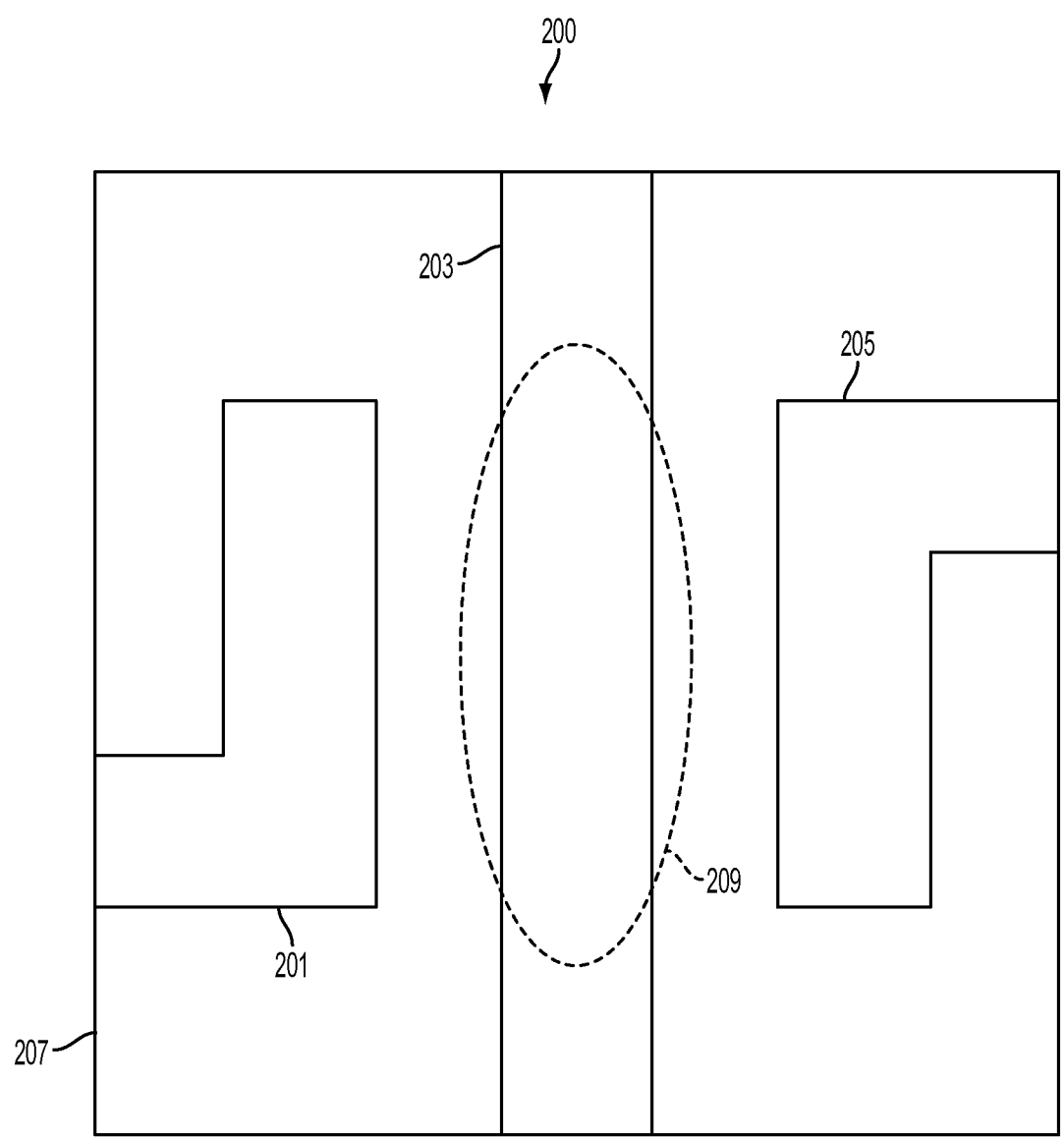
FIG. 2 schematically illustrates an exemplary actual problematic layout pattern, according to an exemplary embodiment.

FIG. 2 schematically illustrates an exemplary actual problematic layout pattern, according to an exemplary embodiment. The purpose of FIG. 2 is merely to convey one possible actual problematic layout pattern. It is contemplated that actual problematic layout patterns may be alternatively configured and may, when manufactured, result in additional and/or alternative manufactured hotspots, i.e., at least one fabricated geometric element exhibiting one or more yield and/or reliability detracting features, such as bridging, necking, notching, pinching, line-end shorting, stressing, and/or the like. As shown, actual problematic layout pattern 200 includes a plurality of geometric elements (or features), such as geometric elements 201, 203, and 205, within boundary 207. When manufactured, pattern 200 may result in necking and/or pinching issues within region 209 of feature 203. The physical and/or spatial configuration of geometric elements 201 through 205 may not exhibit conventional design verification rule violations, but may still cause, at least in part, manufactured hotspots due to, for example, a "proximity effect," which arises from a particular spatial configuration of geometric elements in a vicinity of region 209. It is further noted that the proximity effect may result, at least in part, from an aggregation of individual manufacturing process-related effects, such as lithography-related effects and mechanical stress-related effects, when constituent geometric elements 201 through 205 of pattern 200 are being manufactured. Proximity-based effects may be further understood in association with FIG. 3.

Figure 3:
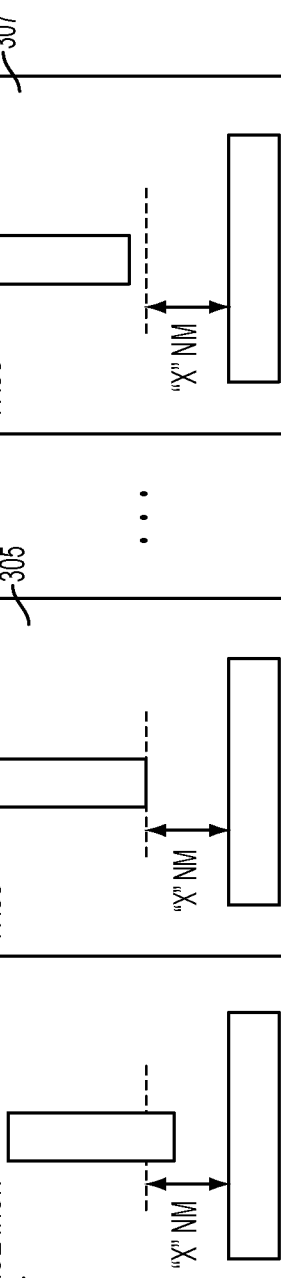
FIG. 3 schematically illustrates in table form a comparison between the application of conventional design verification rules and the application of design verification plus rules, according to an exemplary embodiment.

FIG. 3 schematically illustrates in table form a comparison between the application of conventional design verification rules and the application of design verification plus rules, according to an exemplary embodiment. Table 300 provides a plurality of physical IC layout patterns exhibiting line-end spacing to another line configuration in relation to a plurality of spatial configurations of these geometric elements. For instance, row 301 provides the results of the application of a particular conventional design verification rule requiring minimum dimensional spacing of at least "X" nm between a first line-end and another line. Pane 303 illustrates, for a first spatial configuration of geometric elements, a line-end spacing to another line configuration that clearly violates the conventional design verification rule of row 301 and, thus, would be flagged as a conventional design verification rule violation. Panes 305 and 307 respectively demonstrate other spatial configurations of geometric elements that would pass the conventional design verification rule of row 301.

Row 309 provides a plurality of physical IC layout patterns including geometric elements where a line-end is at least partially surrounded by interconnected geometric element segments forming a multi-dimensional configuration. Again, a conventional design verification rule is applied against the physical IC layout patterns requiring minimum dimensional spacing of at least "X" nm between a line-end and another line. Pane 311 illustrates, that in the first spatial configuration, the physical IC layout pattern violates the conventional design verification rule of row 309 and, thereby, would result in a design verification rule violation. Pane 313 demonstrates a non-violation situation that, due to the density of geometric elements surrounding the line-end structure, the line-end structure may prove difficult to manufacture due to one or more proximity effects and, therefore, may affect IC production yield and/or reliability. As such, this proximity effect-based violation would pass conventional design verification procedures. At the $n^{th}$ spatial configuration (shown in pane 315), the density of geometric elements surrounding the line-end structure is eased. Not only does this spatial configuration pass the conventional design verification rule of row 309, but it also enables IC production yields and reliability to increase because the proximity effects present in the second spatial configuration are eliminated.

Row 317 illustrates a plurality of physical IC patterns applied against one or more design verification plus rules where conventional line-end spacing design verification rules are enforced through multi-dimensional pattern matching instances identified when at least one previously stored actual problematic layout pattern is matched with one or more geometric element structures of the illustrated layout designs of panes 319, 321, and 323. Thus, panes 319 and 321 demonstrate instances when previously stored actual problematic layout patterns would be matched to the spatial configuration of geometric elements defining the illustrated physical IC layout patterns and, therefore, would result in design verification plus rule violations. In this manner, the proximity effect-based violation exhibited in pane 321 is identified and flagged as a design verification plus rule violation, whereas in pane 313 the proximity effect-based violation would pass conventional design verification processes. The physical IC layout pattern of pane 323 demonstrates a spatial configuration not matching a previously stored actual problematic layout pattern and, therefore, would pass design verification plus procedures.

Returning to FIG. 1, overall process flow 100 includes design verification plus rule generation process 103 configured to generate one or more design verification plus rules that may be applied against physical IC block layout patterns to identify potential problematic layout patterns within the physical IC block layout patterns, such as at or near a boundary of the physical IC block layout patterns. Process 103 may receive (or retrieve) actual problematic layout patterns and, in certain embodiments, other information stored in association with the actual problematic layout patterns from repository 101. The actual problematic layout patterns may be converted into image-based mathematical presentations (or representations) that may be manipulated in association with process 103 to determine and/or create one or more potential problematic layout patterns.

To control detection sensitivity of one or more design verification plus processes, such as design verification plus process 105, the determination of potentially problematic layout patterns from actual problematic layout patterns may be based on one or more sensitivity parameters. For instance, a potentially problematic layout pattern may be determined to correspond to one or more portions of an actual problematic layout pattern, such as one or more of the constituent geometric elements of the actual problematic layout pattern as those geometric elements are spatially configured in the actual problematic layout pattern. One or more other sensitivity parameters may be utilized to control the relationship between the spatial configuration of constituent geometric elements of a potential problematic layout pattern and an actual problematic layout pattern from which the potential problematic layout pattern was determined and/or created. An exemplary conversion between an actual problematic layout pattern and a potential problematic layout pattern is described in more detail with FIG. 4. Various potentially problematic layout patterns at various sensitivities are provided in association with FIG. 5.

Figure 4:
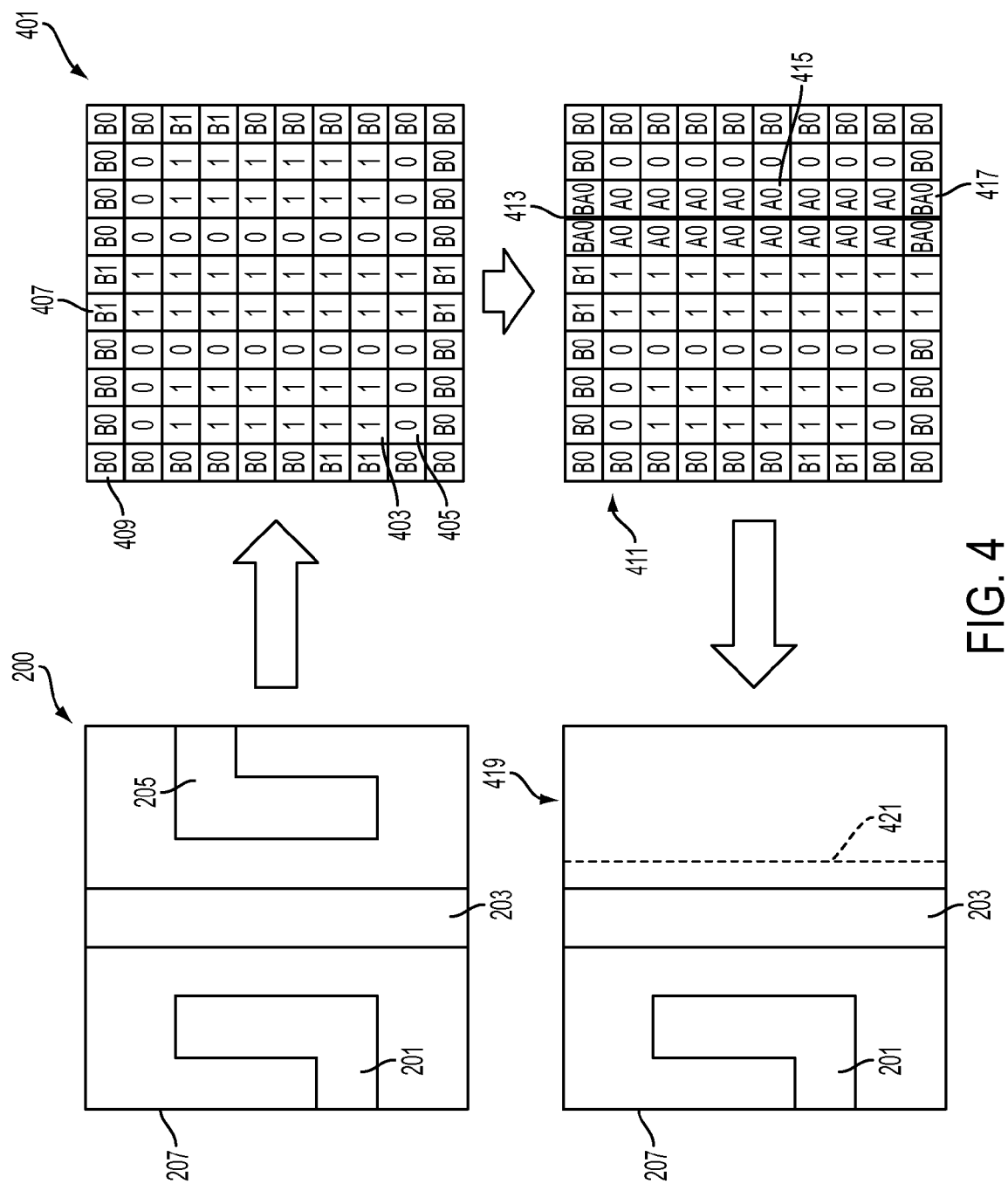
FIG. 4 schematically illustrates a conversion between an actual problematic layout pattern and a potential problematic layout pattern, according to an exemplary embodiment.

FIG. 4 schematically illustrates a conversion between an actual problematic layout pattern and a potential problematic layout pattern, according to an exemplary embodiment. Utilizing actual problematic layout pattern 200 of FIG. 2 as an example, pattern 200 including constituent geometric elements 201 through 205 may be pixilated (or otherwise digitized) as a pixilated matrix with each pixel of the matrix being represented as a vector defined by, for example, a 1 or 0. In certain embodiments, one or more additional indicators may be utilized and/or appended to vector values to convey boundary pixels. For instance, pattern 200 may be represented as pixilated matrix 401 including a plurality of vector defined pixels, such as vector-defined pixels 403 through 409. In this manner, vector-defined pixels like pixel 403 may relate to portions of the actual problematic layout pattern corresponding to at least a portion of a constituent geometric element, whereas vector-defined pixels like pixel 405 may relate to portions of the actual problematic layout pattern not corresponding to at least a portion of a constituent geometric element. Vector-defined pixels 407 and 409 may be utilized in conjunction with one or more other vector defined pixels to convey boundary 207 of pattern 200. As such, vector-defined pixels like pixel 407 may relate to portions of the actual problematic layout pattern where at least a portion of a constituent geometric element defines a portion of boundary 207. Vector-defined pixels like pixel 409 may relate to boundary portions of the actual problematic layout not being defined by at least a portion of a constituent geometric element. This pixel-based representation of actual problematic layout patterns is straightforward and easily manipulated to determine and/or create potential problematic layout patterns, such as potential problematic layout pattern 411.

In this example, potential problematic layout pattern 411 may have been determined and/or created to include constituent geometric elements 201 and 203 based on a first sensitivity parameter. As such, one or more vector-defined pixels relating to constituent geometric element 205 may be manipulated from first vector values to second vector values to remove the feature from pattern 411. When potential problematic layout patterns, such as pattern 411, are being applied at or near a boundary of a physical IC block design, one or more alignment boundaries, such as alignment boundary 413, may be defined to facilitate design verification plus processes, as will become more apparent below. In this manner, one or more additional indicators may be utilized and/or appended to vector values to convey alignment boundaries and/or boundary pixels where an alignment boundary is aligned to or intersects with a boundary of the potential problematic layout pattern. For instance, vector-defined pixels 415 and 417 may be utilized in conjunction with one or more other vector defined pixels to convey alignment boundary 413. As such, vector-defined pixels like pixel 415 may be utilized to relate to portions of the problematic layout pattern not including at least a portion of a constituent geometric element, but interfacing with or including an alignment boundary like boundary 413. While not illustrated, the vector-defined value of pixel 415 may be manipulated from 0 to 1 to indicate portions of the problematic layout pattern including at least a portion of a constituent geometric element that interfaces with or includes an alignment boundary like boundary 413. Vector-defined pixels like pixel 417 may be utilized to relate to boundary portions of the problematic layout pattern where an alignment boundary is aligned to or intersects with a boundary portion, but neither boundary is defined by or includes at least a portion of a constituent geometric element. Similarly to pixel 415, the vector-defined value of pixel 417 may be manipulated from 0 to 1 to indicate boundary portions of the problematic layout pattern including at least a portion of a constituent geometric element that interfaces with or includes the boundaries.

Accordingly, pixilated matrix 411 may be utilized to define and/or create potential problematic layout pattern 419. In this example, pattern 419 includes constituent geometric elements 201 and 203 of actual problematic layout pattern 200, which are bounded by boundary 207. Further, pattern 419 includes alignment boundary 421.

Figure 5:
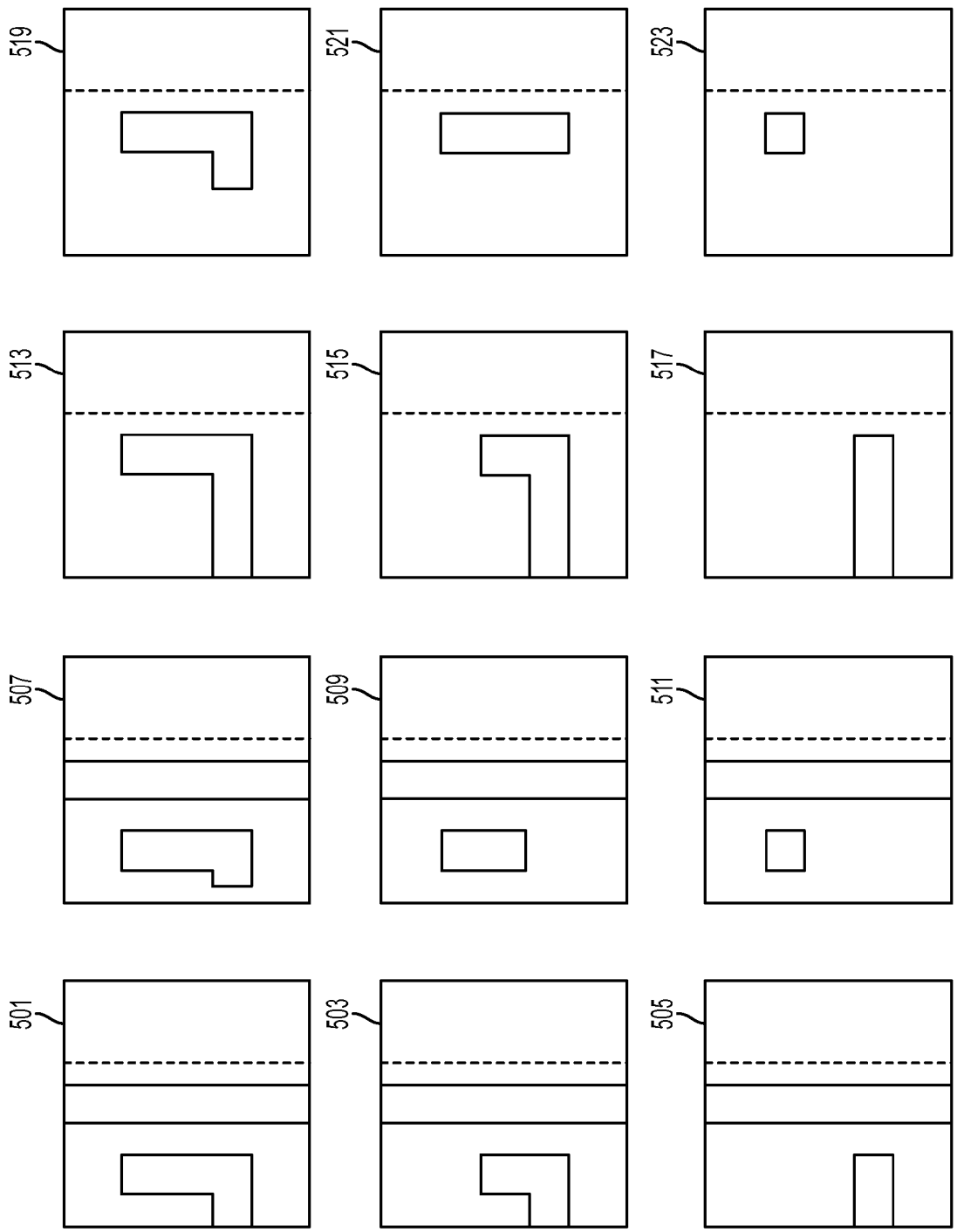
FIG. 5 schematically illustrates potentially problematic layout patterns at various sensitivities, according to an exemplary embodiment.

As previously described, potential problematic layout patterns may be determined and/or created based on one or more sensitivity parameters configured to control how much of an actual problematic layout pattern must be present in a physical IC block layout pattern to trigger a design verification plus violation. One or more other sensitivity parameters may be utilized to control the relationship between the spatial configuration of constituent geometric elements of a potential problematic layout pattern and an actual problematic layout pattern. FIG. 5 schematically illustrates potentially problematic layout patterns at various sensitivities, according to an exemplary embodiment. As shown, the adjustment of one or more sensitivity parameters may result in one or more of potentially problematic layout patterns 501 through 523, which are merely illustrative in nature.

Adverting again to FIG. 1, design verification plus rule generation process 103 may be configured to consolidate (or cluster) actual and/or potential problematic layout patterns. For instance, sufficiently similar actual problematic layout patterns may be consolidated to reduce the number of actual problematic layout patterns that are utilized to determine and/or create potential problematic layout patterns. As another example, sufficiently similar actual and/or potential problematic layout patterns may be consolidated to reduce the number of actual and/or potential problematic layout patterns that are utilized to generate one or more design verification plus rules during design verification plus rule generation process 103. In other instances, sufficiently similar actual and/or potential problematic layout patterns may be consolidated to reduce the number of actual and/or potential problematic layout patterns that are searched for during design verification plus process 105. As such, actual and/or potential problematic layout patterns may be hierarchically clustered, incrementally clustered, and/or otherwise clustered to achieve one or more consolidation purposes.

Accordingly, process 103 may generate one or more design verification plus rules based on one or more actual and/or potential problematic layout patterns and, in certain embodiments, other information stored to repository 101. Generated design verification plus rules may be stored to, for instance, design verification plus rules repository 107. Repository 107 may be periodically updated to account for variant manufacturing processes and/or advancements in technology nodes. It is also noted that repository 107 may be embedded as part of one or more electronic design automation (EDA) tools, such as one or more design verification plus tools. An illustrative design verification plus rule is explained in more detail in conjunction with FIG. 6. An exemplary process for generating one or more design verification plus rules is more fully described in association with FIG. 7.

Figure 6:
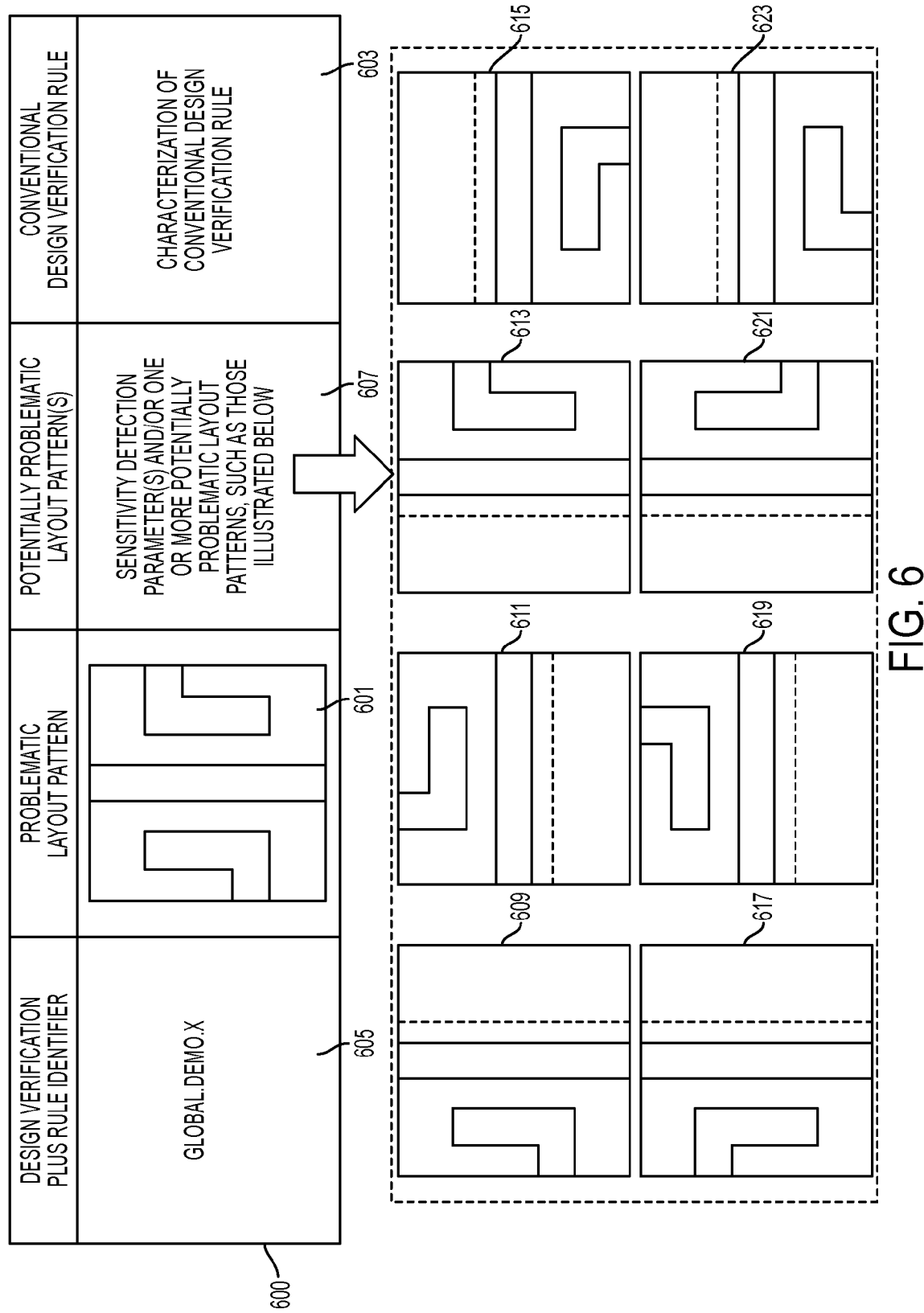
FIG. 6 schematically illustrates in table form a design verification plus rule, according to an exemplary embodiment.

FIG. 6 schematically illustrates in table form a design verification plus rule, according to an exemplary embodiment. The purpose of FIG. 6 is merely to convey one possible design verification plus rule and, as such, it is contemplated that other design verification plus rules may be generated and/or alternatively configured for application against physical IC block layout patterns, as will become more apparent below. As shown, exemplary design verification plus rule 600 combines actual problematic layout pattern 601 with one or more conventional design verification rule descriptions 603. The resulting combination may be identified and/or retrieved based on design verification plus rule identifier 605. According to various embodiments, rule 600 also associates actual problematic layout pattern 601 with one or more sensitivity parameters and/or potential problematic layout patterns 607. These additional design verification features may be provided to account for the fact that, at or near physical IC block layout pattern boundaries, the application of conventional design verification rules and design verification plus rules break down. This is because physical IC block layout patterns are first designed and verified, and then later modularly integrated as part of other IC designs, such as full SoC designs. Thus, at or near physical IC block layout pattern boundaries, actual problematic layout patterns, such as actual problematic layout pattern 601, may not occur until after the physical IC block layout pattern is integrated as part of another IC design including geometric elements that, when juxtaposed with geometric elements at the boundary of the physical IC block layout pattern, result in at least one actual problematic layout pattern. Traditionally, IC designers have had to re-verify resulting combinations of these IC designs, which wastes valuable time and resources. As such, it is advantageous not only to identify actual problematic layout patterns when a physical IC block layout pattern is designed, but also to identify and handle potential problematic layout patterns that have a sufficient likelihood of resulting in one or more actual problematic layout patterns when the physical IC block layout pattern is later integrated as part of another IC design.

Exemplary potential problematic layout patterns, which may result in actual problematic layout pattern 601, are illustrated at 609 through 623. These potential problematic layout patterns represent eight transformations of potential problematic layout pattern 609. Namely, potential problematic layout patterns 609 through 615 are four rotations (e.g., 0°, 90°, 180°, and 270° rotations) of potential problematic layout pattern 609. Further, potential problematic layout patterns 617 through 623 are four rotations (e.g., 0°, 90°, 180°, and 270° rotations) of potential problematic layout pattern 617, which itself is a reflection of potential problematic layout pattern 609. Other potential problematic layout patterns may be provided, such as one or more other rotations and/or reflections of potential problematic layout pattern 609. Additionally or alternatively, these or other potential problematic layout patterns may correspond to respective transformations of one or more of potential problematic layout patterns 501 through 523 and/or any other potential problematic layout pattern determined based on one or more sensitivity parameters.

Figure 7:
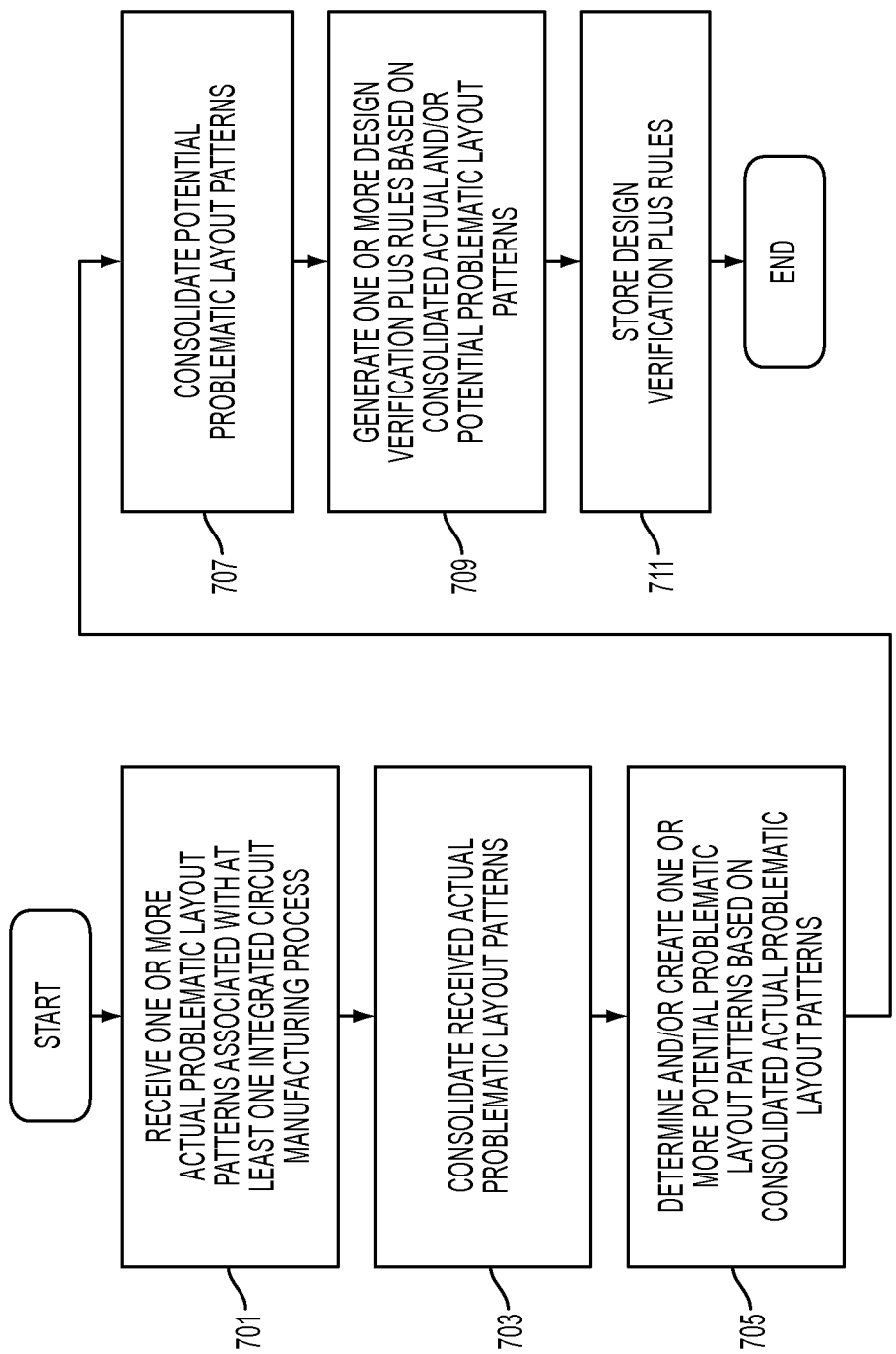
FIG. 7 is a flowchart of a process for creating one or more design verification plus rules, according to an exemplary embodiment.

FIG. 7 is a flowchart of a process for generating one or more design verification plus rules, according to an exemplary embodiment. For illustrative purposes, the process is described with reference to FIGS. 1 and 6. Further, the steps of the process may be performed in any suitable order, as well as combined or separated in any suitable manner. At step 701, one or more actual problematic layout patterns associated with one or more particular manufacturing processes are received (or retrieved) by, for example, design verification plus rules generation process 103 from, for instance, actual problematic layout patterns repository 101. Additionally, other information stored to repository 101 may be received by process 103. In this manner, process 103 may consolidate received actual problematic layout patterns utilizing one or more of the aforementioned consolidation techniques, per step 703. In step 705, process 103 determines and/or creates one or more potential problematic layout patterns based on the consolidated actual problematic layout patterns. For example, process 103 may determine and/or create potential problematic layout patterns 609 through 623 based on actual problematic layout pattern 601. As previously described, this process may be based on one or more sensitivity parameters.

Accordingly, process 103 may consolidate determined and/or created potential problematic layout patterns, per step 707, in a similar fashion to step 703. In step 709, one or more design verification plus rules are generated based on one or more consolidated actual and/or potential problematic layout patterns, such as design verification plus rule 600. The generation of design verification plus rules may be based on other information retrieved from repository 101. At step 711, generated design verification plus rules may be stored to, for instance, design verification plus rules repository 107, which may be further stored to repository 107 in association with one or more related manufacturing processes.

Referring again to FIG. 1, exemplary design verification plus rules stored to repository 107 may be utilized in association with one or more design verification plus processes 105 intended to confirm that design data corresponding to, for example, a physical IC block layout pattern does not include any actual problematic layout patterns. Design verification plus process 105 may be further configured to utilize design verification plus rules stored to repository 107 to confirm that the design data does not also include any potential problematic layout patterns at least at (or near) a boundary of the physical IC block layout pattern that, when randomly juxtaposed with or integrated as part of one or more other physical IC layout patterns, have a sufficient likelihood of resulting in at least one actual problematic layout pattern. In this manner, process 105 may receive (or retrieve) physical IC block layout patterns from, for instance, physical IC block designs repository 109, which may be periodically updated, such as, in response to, receiving one or more modular and/or modified physical IC block designs from, for example, modular physical IC block designs repository 111. Repository 109 may, in certain embodiments, be embedded as part of one or more EDA tools, such as one or more design verification plus tools. An exemplary physical IC block design is described in more detail in association with FIG. 9A.

Figure 8:
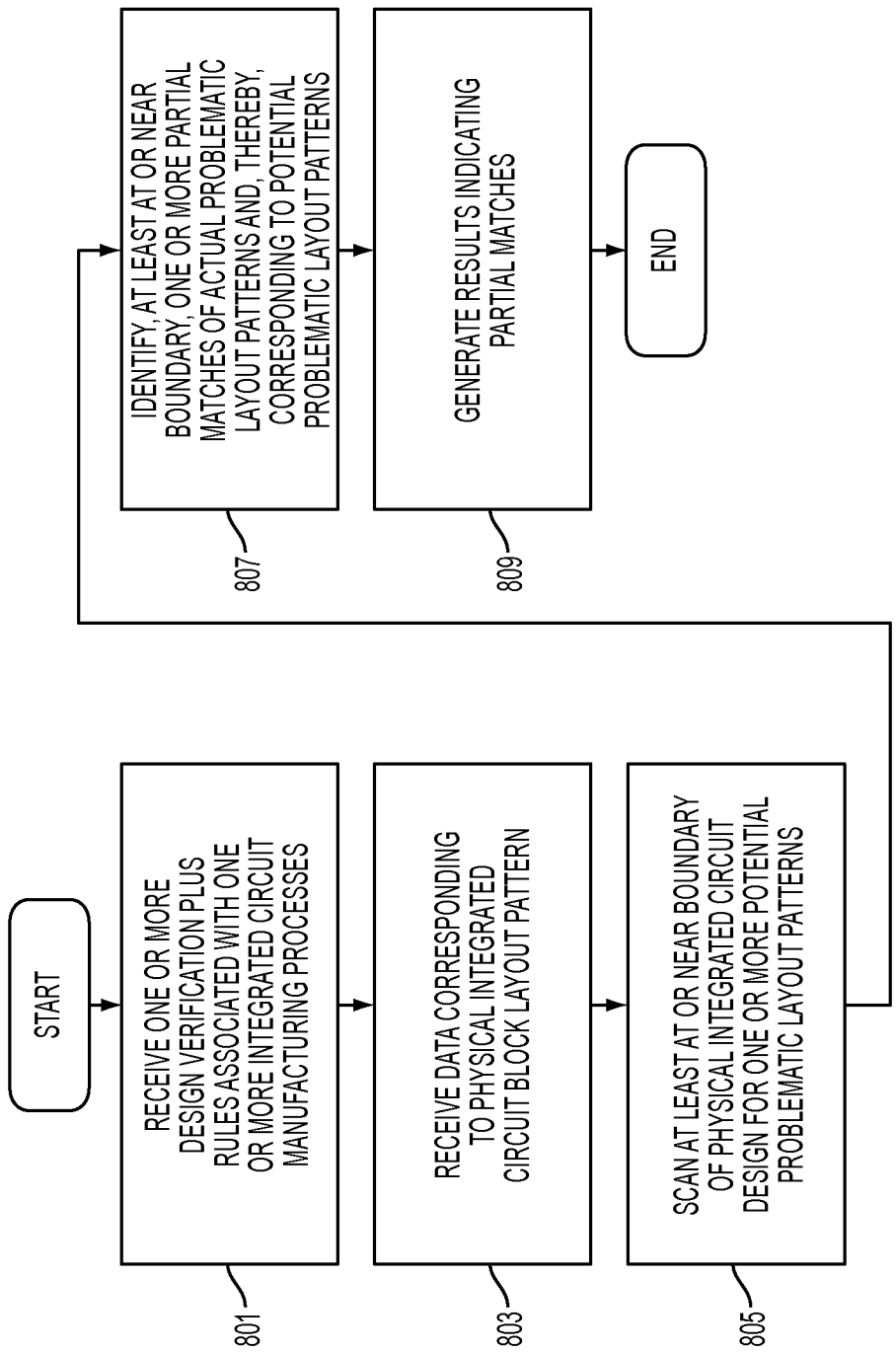
FIG. 8 is a flowchart of a process for identifying potential problematic layout patterns at least at a boundary of a physical integrated circuit block design, according to an exemplary embodiment.
Figure 9A:
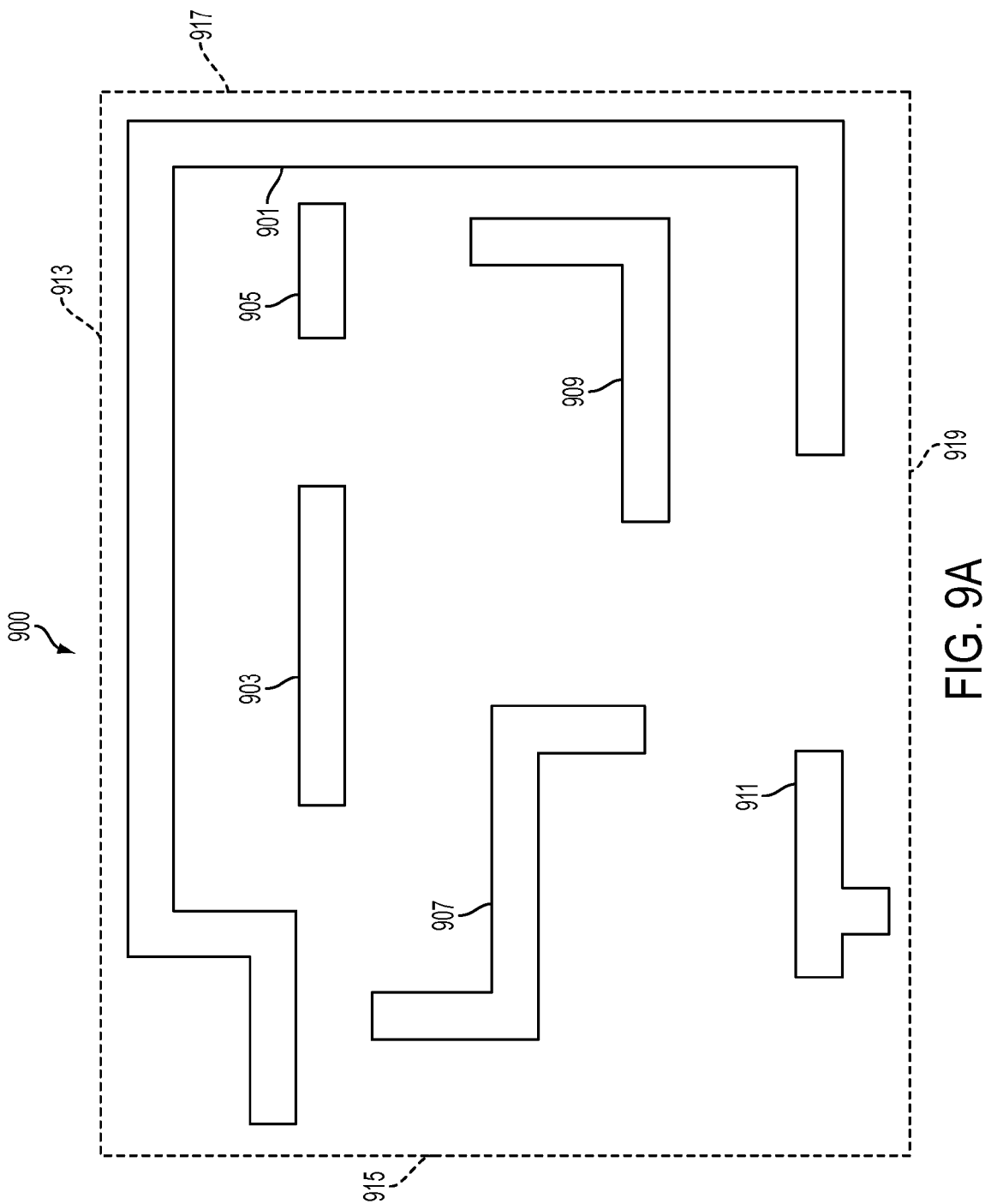
FIG. 9A schematically illustrates a physical integrated circuit block layout pattern, according to an exemplary embodiment.
Figure 9B:
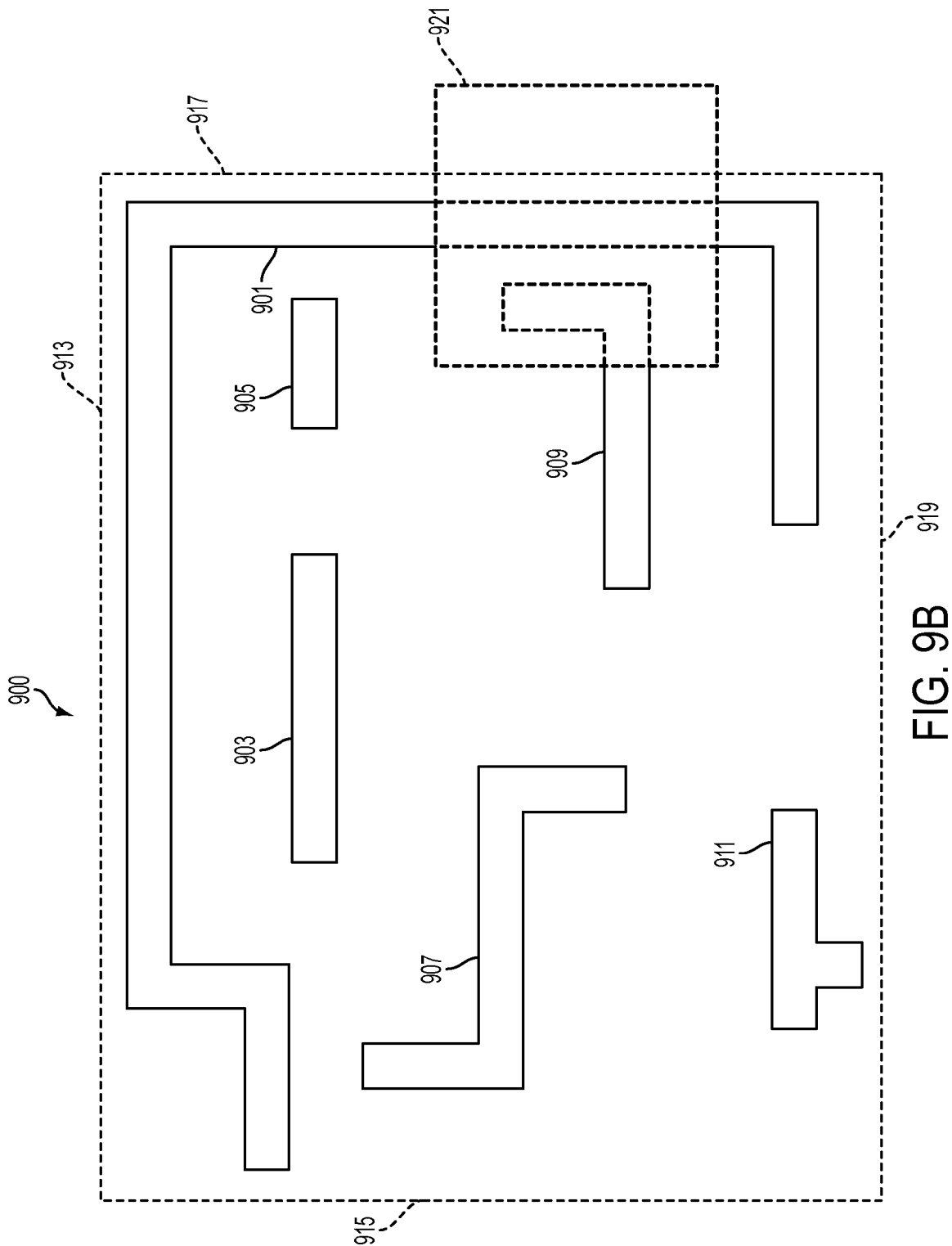
FIGS. 9B and 9C schematically illustrate the physical integrated circuit block layout pattern of FIG. 9A with identified potentially problematic layout patterns identified based on a plurality of detection sensitivities, according to various exemplary embodiments.
Figure 9C:
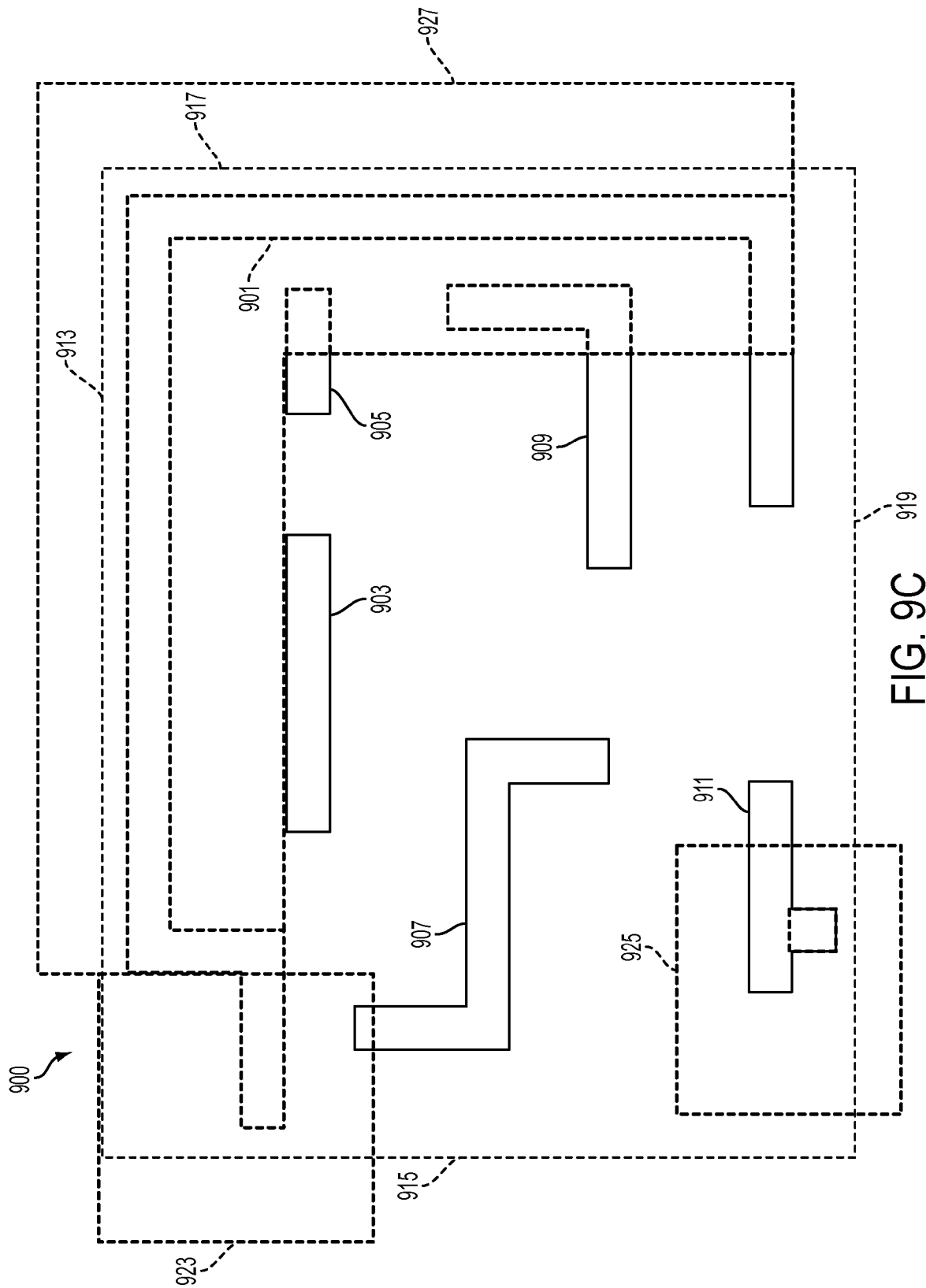
Figure 9D:
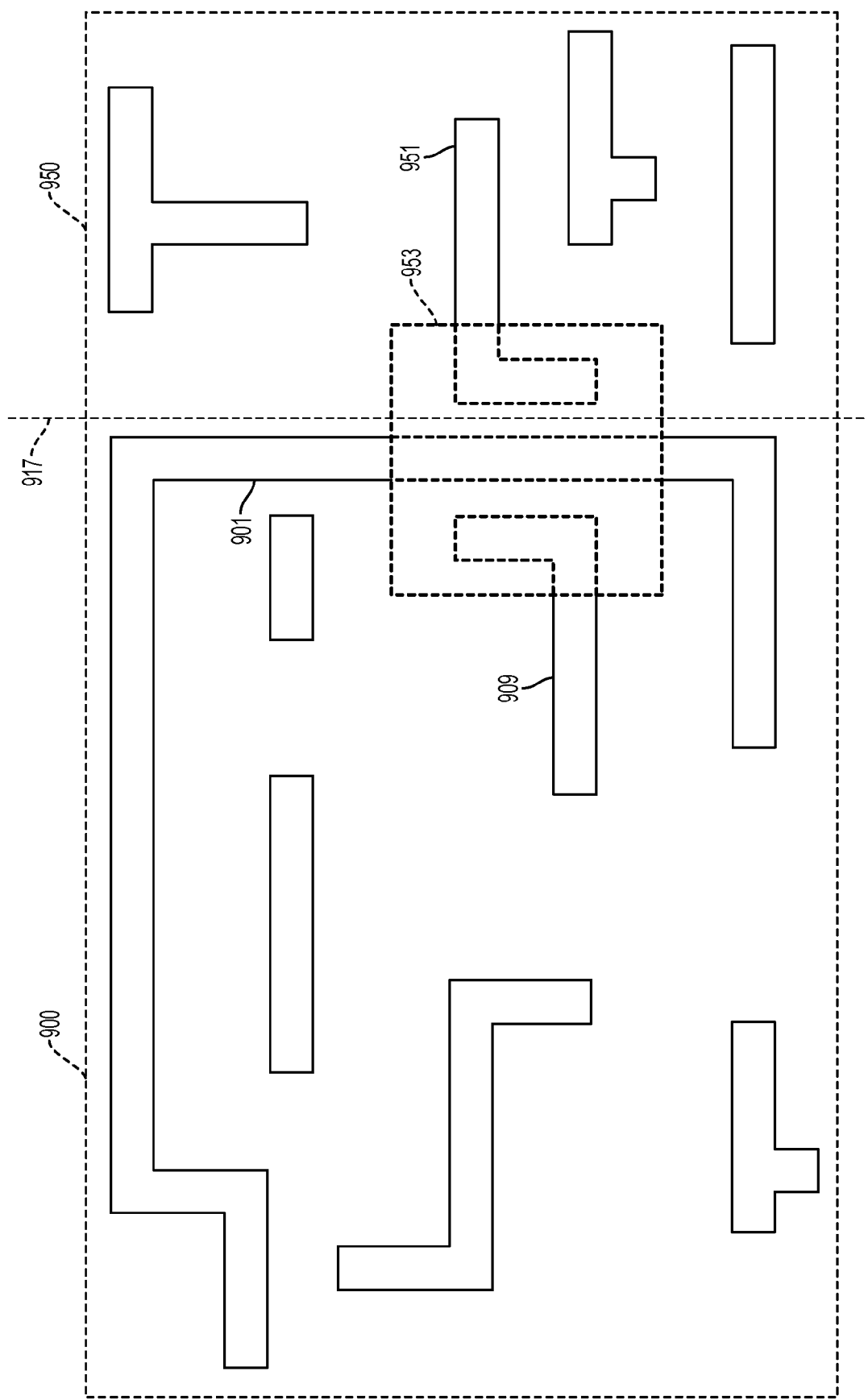
FIG. 9D schematically illustrates the physical integrated circuit block layout pattern of FIG. 9A integrated as part of another integrated circuit design and, thereby, including an actual problematic layout pattern, according to an exemplary embodiment.

According to exemplary embodiments, process 105 may identify one or more actual and/or potential problematic layout patterns, which is described in more detail in conjunction with FIGS. 8 through 9D. Generally, however, actual and/or potential problematic layout patterns may, in certain embodiments, be identified based on one or more multi-dimensional pattern matching techniques carried out via multi-dimensional pattern matching module 113. For instance, a potentially problematic layout pattern may be identified when a sufficient level of similarity is determined by module 113 to exist between at least a portion of a physical IC block layout pattern and an actual problematic layout pattern. This sufficient level of similarity may be calculated by module 113 based on determining an amount of area overlapping the portion of the physical IC block layout pattern including the potentially problematic layout pattern and at least one actual problematic layout pattern stored in association with at least one design verification plus rule. In certain embodiments, module 113 may utilize one or more rectangle-based algorithmic determinations to effectuate these determinations and/or calculations. Further, the sensitivity of detection of module 113 may be controlled through one or more sensitivity detection parameters, which may control the amount of overlapping area required for the portion of the physical IC layout pattern to be identified as a potentially problematic layout pattern. For example, a first level of detection sensitivity may require at least a first amount of overlapping area to be identified, whereas other levels of detection sensitivity may require different amounts of overlapping area to be identified. In this manner, module 113 may utilize one or more sensitivity parameters stored in association with design verification plus rules of repository 107. Thus, application of various sensitivities of detection by module 113 may result in the identification of at least one potential problematic layout pattern, such as one or more of potential problematic layout patterns 501 through 523.

Additionally or alternatively, actual and/or potential problematic layout patterns may be identified by module 113 based on one or more multi-dimensional pattern matching techniques configured to scan for actual and/or potential problematic layout patterns stored in association with one or more design verification plus rules, such as actual problematic layout pattern 601 and/or potential problematic layout patterns 609 through 623. Still further, module 113 may provide one or more actual and/or problematic layout pattern matches to conventional design verification module 115 for the application of one or more conventional design verification rules.

FIG. 8 is a flowchart of a process for identifying potential problematic layout patterns at least at a boundary of a physical integrated circuit block design, according to an exemplary embodiment. For illustrative purposes, the process is described in association with FIGS. 1 and 6, as well as in association with FIGS. 9A through 9D, which are more fully described below. Further, the steps of the process may be performed in any suitable order, as well as combined or separated in any suitable manner. At step 801, design verification plus process 105 may receive one or more design verification plus rules (or data corresponding thereto) associated with one or more IC manufacturing processes from, for instance, repository 107. The design verification plus rules may include layout data associated with one or more actual and/or potential problematic layout patterns. Data corresponding to a physical IC block layout pattern, such as a block layout design of intellectual property, may be received by design verification plus process 105, per step 803. For instance, process 105 may receive data corresponding to an exemplary physical IC block layout pattern (or design) 900 described in more detail in association with FIG. 9A. As shown in FIG. 9A, design 900 includes a plurality of geometric elements, such as geometric elements 901 through 911, spatially disposed in a multi-dimensional configuration bounded by, for instance, boundaries 913 through 919. In this example, the spatial positioning of geometric elements 901 through 911 may be free from actual problematic layout patterns, however, may include one or more potentially problematic layout patterns.

Referring again to FIG. 8, multi-dimensional pattern matching module 113, at step 805, scans at least at or near a boundary of the physical IC block layout pattern for one or more potential problematic layout patterns. For example, module 113 may scan at least portions of design 900 at or near boundaries 913 through 919. Scanning processes may identify one or more potential problematic layout patterns based on one or more of the previously described techniques. In this manner, module 113 identifies, per step 807, at least at the boundary, one or more partial matches, i.e., one or more potential problematic layout patterns, of at least one actual problematic layout pattern to be avoided. As previously described, the sensitivity of detection may be controlled by module 113 based on the application of one or more sensitivity parameters. Various illustrative partial matches of one or more actual problematic layout patterns and, thereby, corresponding to one or more potential problematic layout patterns are more fully explained in association with FIGS. 9B and 9C.

FIG. 9B schematically illustrates the physical IC block layout pattern of FIG. 9A with an identified potential problematic layout pattern identified based on a first detection sensitivity, according to an exemplary embodiment. As shown, design 900 includes potential problematic layout pattern 921 corresponding to, for example, potential problematic layout pattern 609 of design verification plus rule 600. In this manner, identification of potential problematic layout pattern 921 would be based, at least in part, on the spatial positioning of geometric elements 901 and 909 at or near boundary 917.

FIG. 9C schematically illustrates the physical IC block layout pattern of FIG. 9A with various identified potential problematic layout patterns identified based on a plurality of detection sensitivities, according to an exemplary embodiment. In this implementation, at least one applied sensitivity parameter may be relatively lower than at least one sensitivity parameter utilized in the implementation of FIG. 9B. As such, design 900 is now illustrated as including potential problematic layout patterns 923, 925, and 927. Potential problematic layout pattern 923 may correspond to, for example, a horizontal reflection of potential problematic layout pattern 517, whereas potential problematic layout pattern 925 may relate to, for instance, a −90° rotation of potential problematic layout pattern 523. Further, potential problematic layout pattern 927 may correspond to a combination of one or more potential problematic layout patterns, such as a combination between potential problematic layout patterns 501 and 505, a 180° rotation of potential problematic layout pattern 513, a 90° rotation of potential problematic layout pattern 513, and one or more 90° rotations of potential problematic layout patterns 521 and/or 523. In this manner, identification of potential problematic layout patterns 923 through 927 would be based, at least in part, on the spatial positioning of geometric elements 901, 905, 909, and 911 at or near one or more of boundaries 913 through 919.

Adverting again to FIG. 8, process 105 may be configured to identify potentially problematic layout patterns (in step 807) to enable one or more handling (or modification) processes to modify, for example, design 900 to avoid the occurrence of one or more actual problematic layout patterns when, for instance, design 900 is integrated as part of another IC design. An exemplary integrated design including an actual problematic layout pattern is described in more detail in association with FIG. 9D. At step 809, however, process 105 (via one or more of modules 113 and 115) generates results indicating identified partial matches and, thereby, potential problematic layout patterns, which may be presented to an IC designer via any suitable interface, such as at least one graphical user interface (GUI).

FIG. 9D schematically illustrates the physical IC block layout pattern of FIG. 9A integrated as part of another IC design and including at least one actual problematic layout pattern, according to an exemplary embodiment. In this example, design 900 and another physical IC block layout pattern 950 are integrated as part of a larger IC design. As shown, the integration of designs 900 and 950 has resulted in designs 900 and 950 sharing common boundary 917. The spatial positioning of geometric elements 901 and 909 in juxtaposition with the spatial positioning of geometric element 951 has resulted in actual problematic layout pattern 953, which may relate to actual problematic layout pattern 601 of design verification plus rule 600. In order to avoid this outcome, design 900 is subjected to one or more preemptive design verification plus processes, such as process 105, configured to identify and handle potential problematic layout patterns exhibited as part of design 900, such as potential problematic layout pattern 921 of FIG. 9B.

Referring once more to FIG. 1, design verification plus results 117 may be provided to design modification process 119 to enable corresponding physical IC block layout patterns including identified potential problematic layout patterns to be modified to either remove the potential problematic layout pattern or "halo" at least a portion of or near the potential problematic layout patterns with one or more localized blockages. In this manner, process 119 may reposition constituent geometric elements of an identified problematic layout pattern to determine at least one new spatial configuration of these elements where their adjusted physical layout pattern no longer corresponds to a potential problematic layout pattern. Process 119 may, in certain embodiments, receive one or more design verification rules (or design verification plus rules) that may not be violated during modification processes so as to ensure that no new design verification violations (whether actual or potential) are configured in the process of remedying identified problematic layout patterns. As such, process 119 may employ (or implement) the features and functions of design verification plus process 105. Alternatively, process 119 may "halo" at least a portion of one or more potential problematic layout patterns with one or more localized blockages. For instance, process 119 may create one or more localized areas around or near at least a portion of one or more potential problematic layout patterns where routing and/or placement resources for other geometric elements are either reduced or made unavailable. These blockages may be complete or partial. An exemplary modified physical IC block layout pattern including at least one repositioned geometric element is described in more detail in association with FIG. 11A, whereas exemplary modified physical IC block layout patterns including localized blockages are explained in more detail in conjunction with FIGS. 11B through 11E.

According to various embodiments, process 119 may store at least one modified version of the physical IC block layout pattern to modular physical IC layout repository 111, which may also include one or more other physical IC layout patterns configured for modular integration as part of other IC designs, such as configured for random routing and placement within full SoC designs. As such, these modular components may be provided to one or more third-party IC designers 121 for effectuating such integration.

Figure 10:
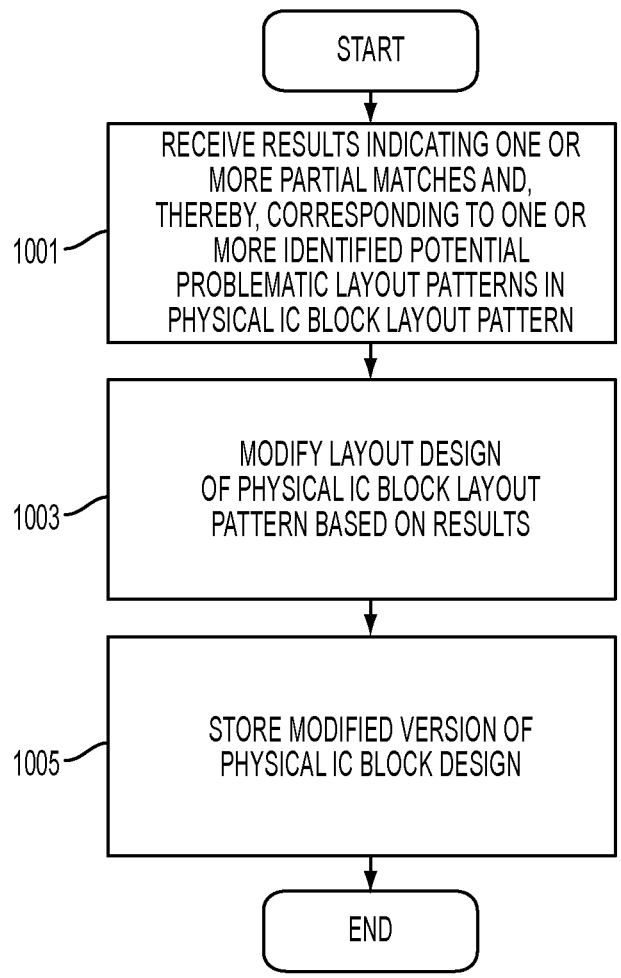
FIG. 10 is a flowchart of a process for modifying a physical integrated circuit block design based on at least one identified potential problematic layout pattern, according to an exemplary embodiment.

FIG. 10 is a flowchart of a process for modifying a physical integrated circuit block design based on at least one identified potential problematic layout pattern, according to an exemplary embodiment. For illustrative purposes, the process is described in association with FIG. 1, as well as in association with FIGS. 11A through 11E, which are more fully described below. Further, the steps of the process may be performed in any suitable order, as well as combined in any suitable manner. At step 1001, process 119 receives results indicating one or more partial matches and, thereby, corresponding to one or more identified potential problematic layout patterns within a physical IC block layout pattern including a layout design, such as design 900. Based on the results, process 119 modifies the layout design, per step 1003.

Figure 11A:
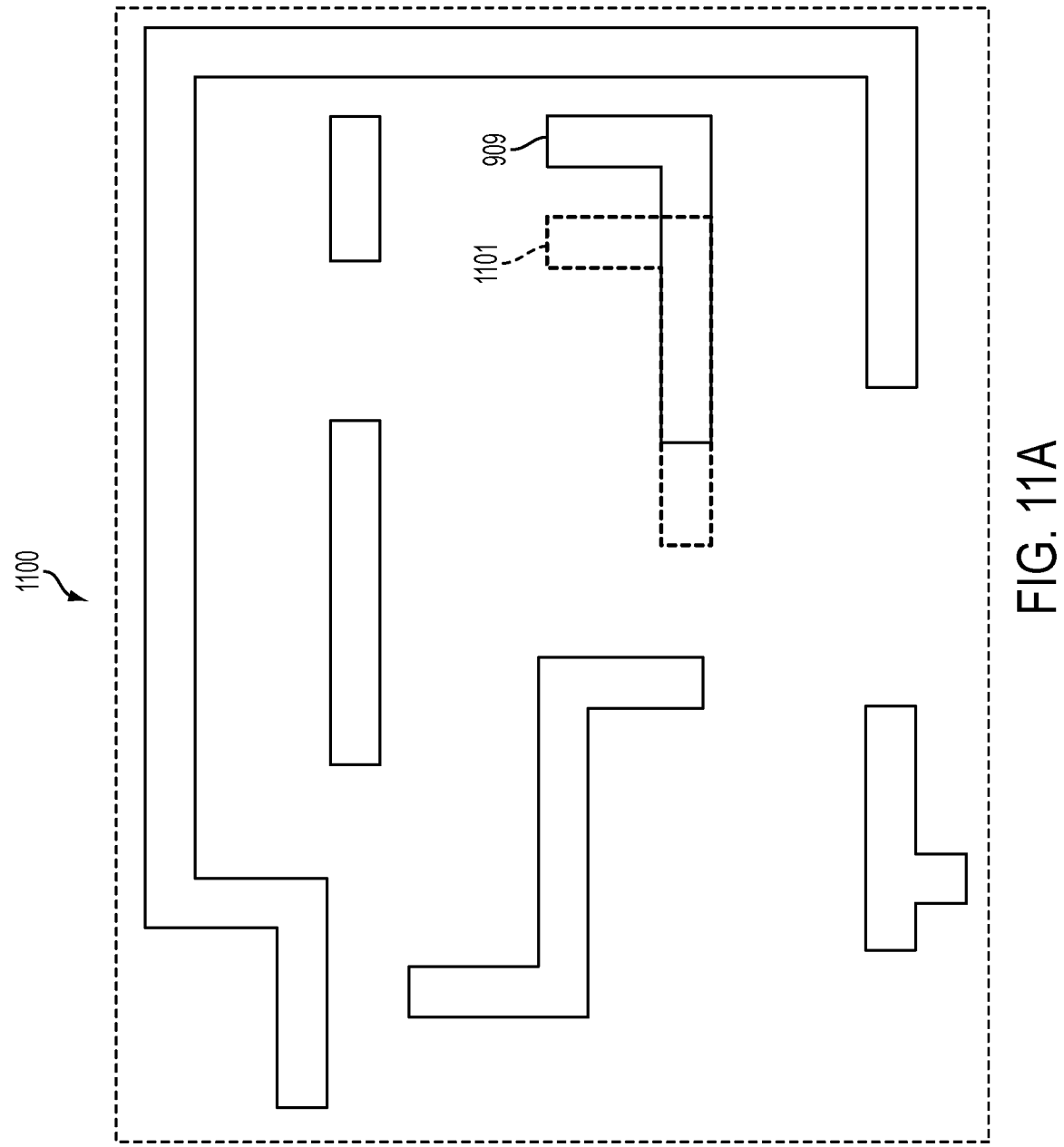
FIGS. 11A through 11E schematically illustrate various modified versions of the physical integrated circuit block layout pattern of FIG. 9A that have been modified based on the identified potentially problematic layout pattern of FIG. 9B, according to various exemplary embodiments.

For instance, process 119 may modify design 900 exhibiting potential problematic layout pattern 921 by repositioning constituent geometric elements of potential problematic layout pattern 921 to determine at least one new spatial configuration of these elements where their adjusted physical layout pattern no longer corresponds to a potential problematic layout pattern, such as the modified physical layout pattern illustrated in FIG. 11A. Adverting to FIG. 11A, there is shown a schematic illustration of a modified version of the physical integrated circuit block layout pattern of FIG. 9A that has been modified based on the identified potentially problematic layout pattern of FIG. 9B, according to an exemplary embodiment. As shown, modified physical IC block layout pattern (or design) 1100 includes constituent geometric element 909 repositioned to modified position 1101, so as to prevent potential problematic layout pattern 921 and, for instance, actual problematic layout pattern 953 when design 1100 is modularly integrated as part of another IC design, such as a full SoC design.

Figure 11B:
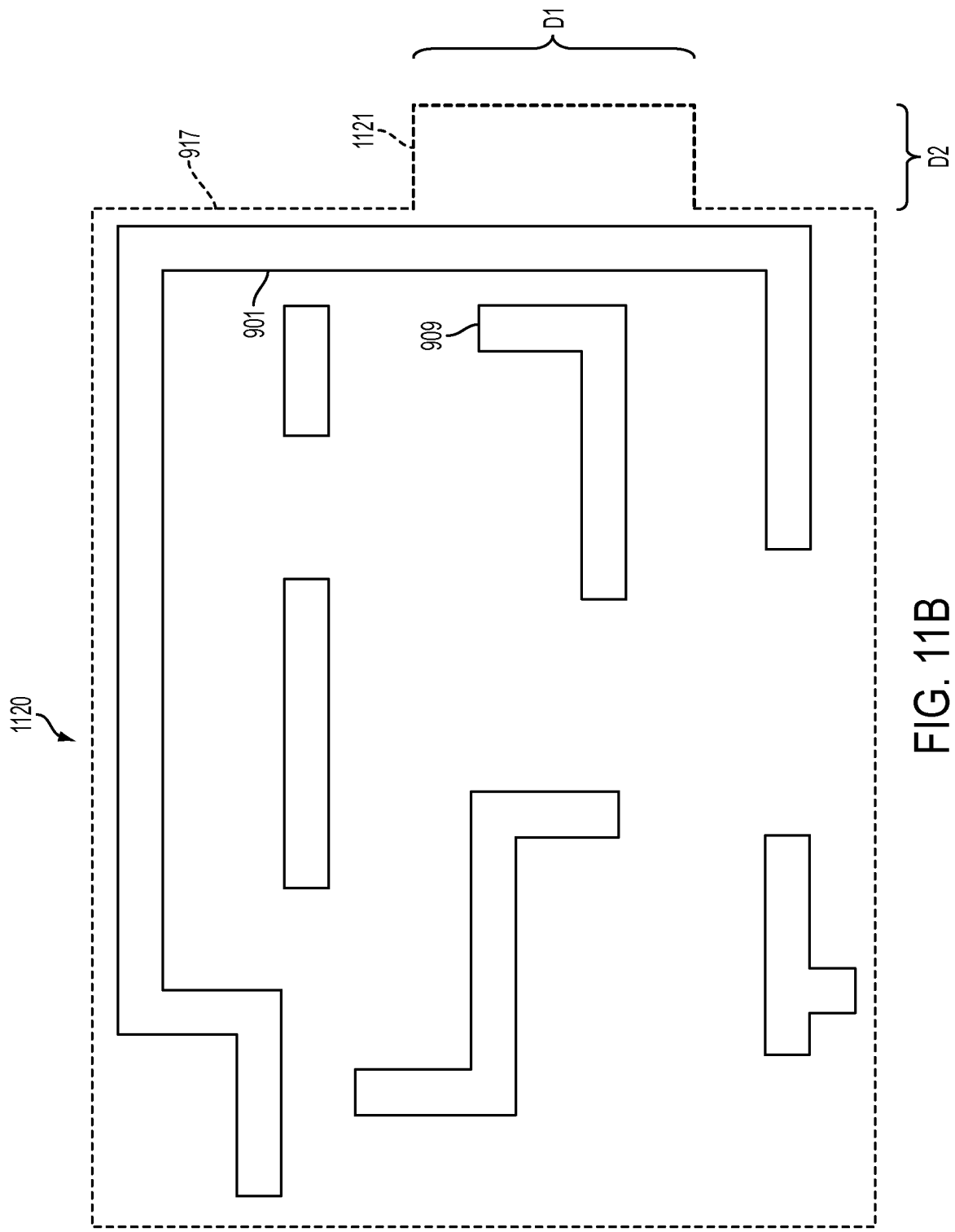
Figure 11C:
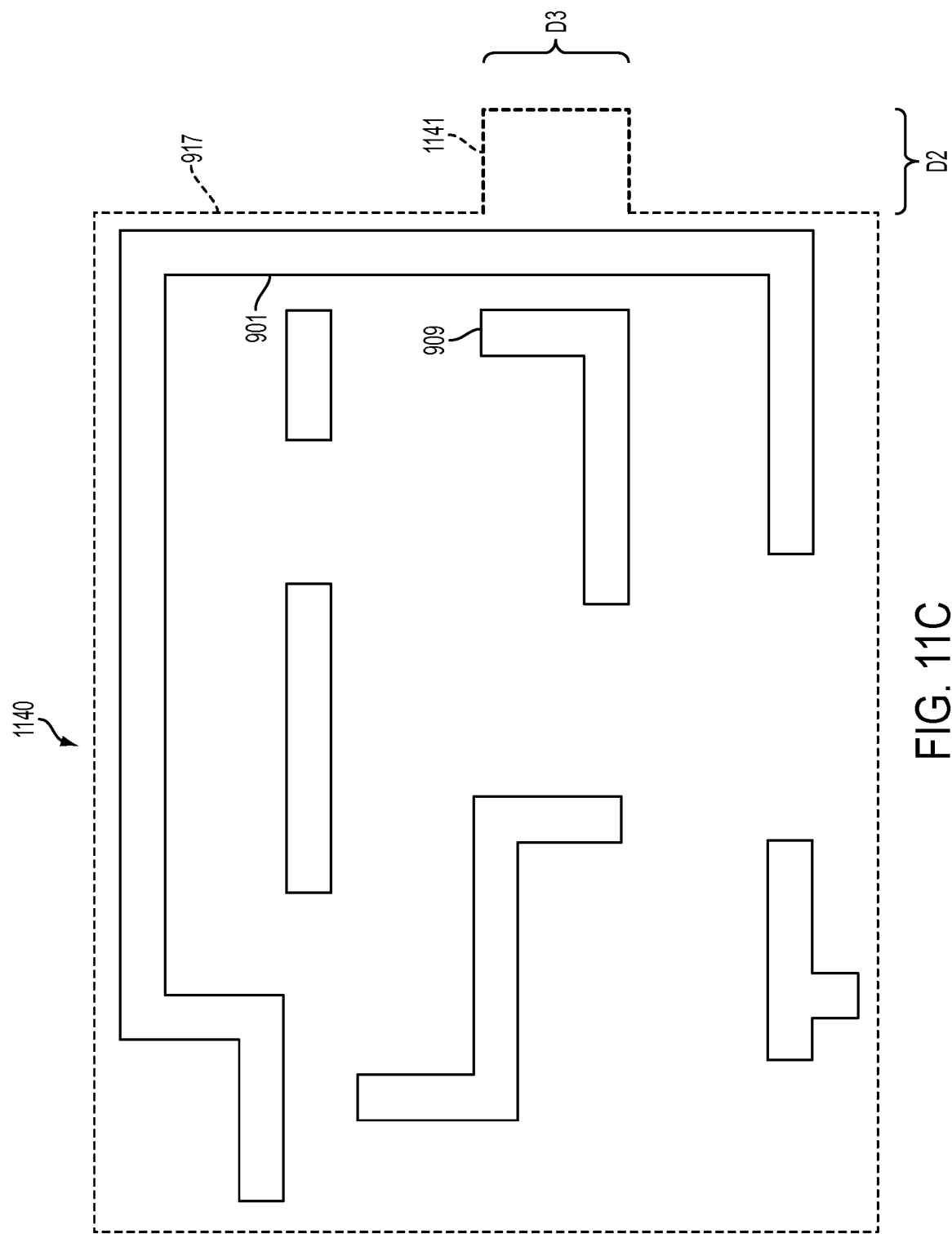

Alternatively, process 119 may "halo" at least a portion of or near one or more potential problematic layout patterns with one or more localized blockages. For instance, process 119 may create one or more localized areas around or near at least a portion of potential problematic layout pattern 921 of design 900 where routing and/or placement resources for other geometric elements, such as geometric elements of another IC design, are either reduced or made unavailable, such as illustrated in FIGS. 11B through 11E. These blockages may be complete or partial. Adverting to FIGS. 11B through 11E, schematic illustrations are provided of modified versions of the physical integrated circuit block layout pattern of FIG. 9A that have been modified based on the identified potentially problematic layout pattern of FIG. 9B, according to various exemplary embodiments. As seen in FIG. 11B, modified physical IC block layout pattern 1120 includes localized blockage 1121, so as to prevent other geometric elements from being routed and/or placed within proximity of potential problematic layout pattern 921. In this example, application of localized blockage 1121 modifies boundary 917 to include a protruded portion of dimensions "D1" and "D2," which may be determined based on a portion of potential problematic layout pattern 921 extending beyond boundary 917. As seen in FIG. 11C, modified physical IC block layout pattern 1140 includes localized blockage 1141, so as to prevent other geometric elements from being routed and/or placed within proximity of constituent geometric elements 901 and 909. In this example, application of localized blockage 1141 modifies boundary 917 to include a protruded portion of dimensions "D2" and "D3," which may be determined based on a portion of potential problematic layout pattern 921 extending beyond boundary 917, but constrained to the vicinity where associated actual problematic layout pattern 953 would result in at least one manufacturing issue, such as a necking and/or pinching issue. Accordingly, D3 may be dimensionally smaller than D1 and, thereby, maximize available routing and placement space for other geometric elements.

Figure 11D:
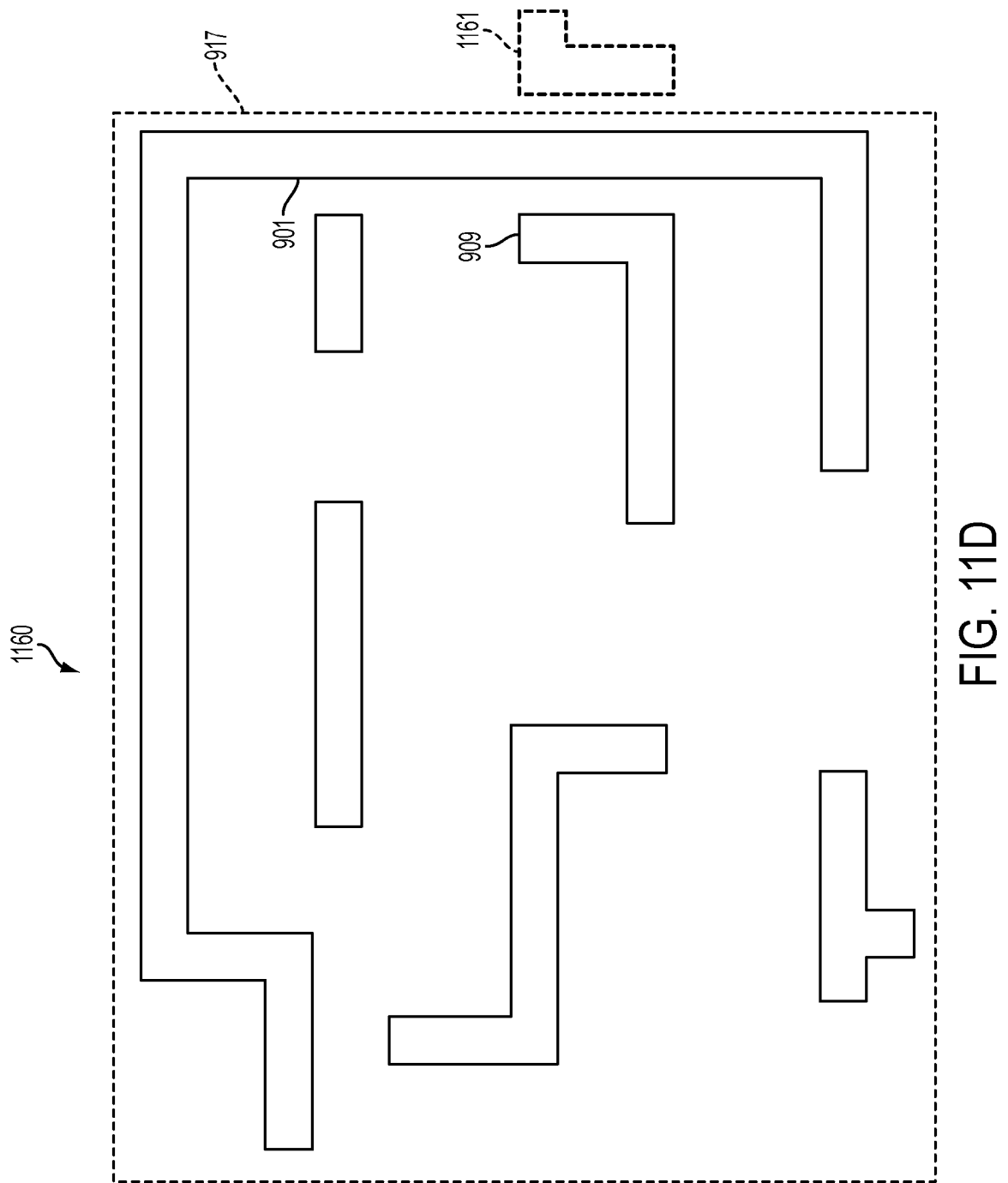

Referring to FIG. 11D, modified physical IC block layout pattern 1160 includes localized blockage 1161, so as to prevent other geometric elements from being routed and/or placed within proximity of constituent geometric elements 901 and 909. In this example, localized blockage 1161 includes at least one place-holding geometric element that is "detached" from boundary 917. In this manner, localized blockage 1161 is not actually manufactured, but merely included as part of design 1160 to prevent potential problematic layout pattern 921 from becoming, for instance, actual problematic layout pattern 953. Localized blockage 1161 may be determined based on at least a portion of actual problematic layout pattern 953 that is not exhibited by design 900, but should be avoided when design 900 and, thereby design 1160, is modularly integrated as part of another IC design, such as a full SoC.

Figure 11E:
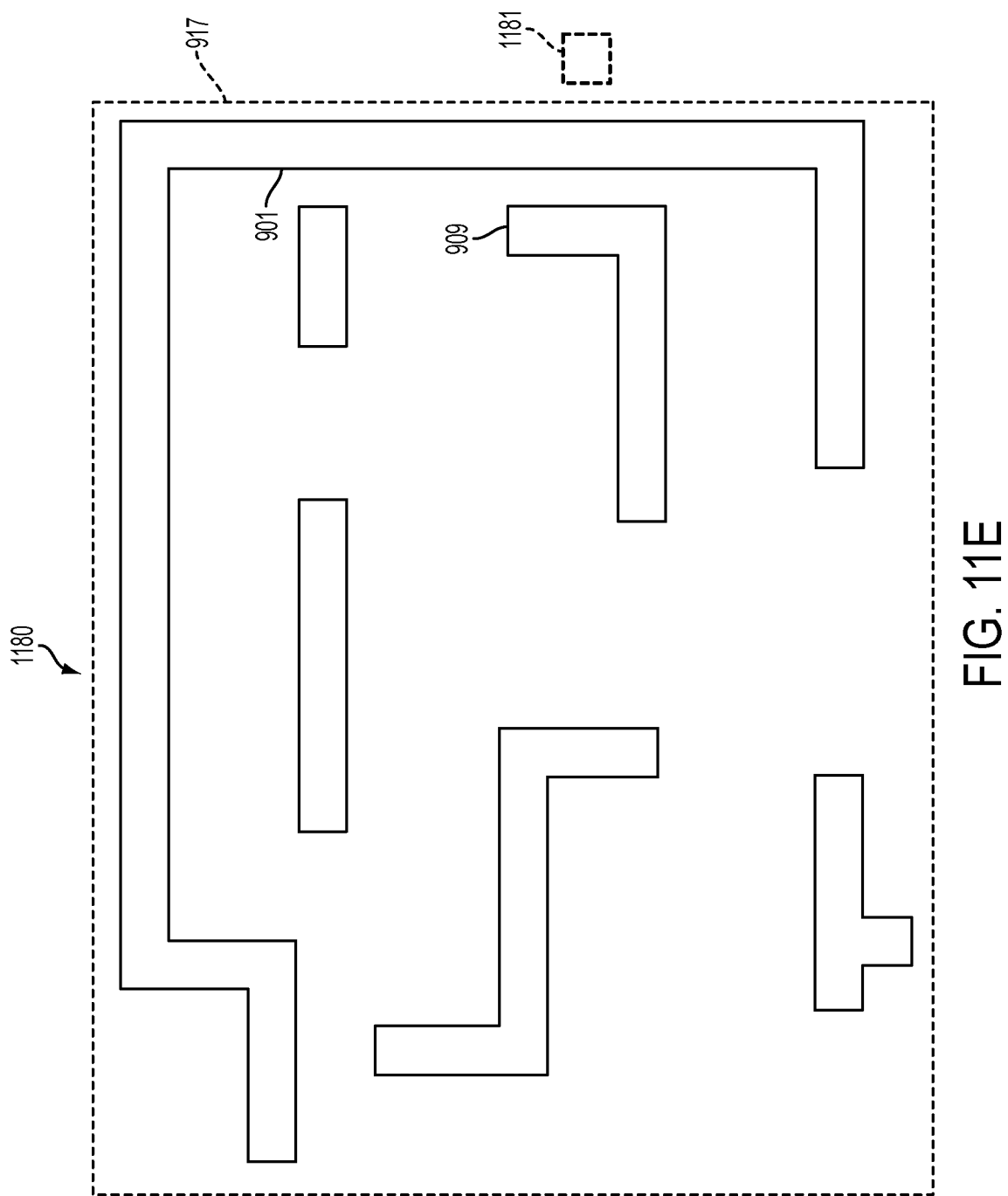

As seen in FIG. 11E, modified physical IC block layout pattern 1180 includes localized blockage 1181, so as to prevent other geometric elements from being routed and/or placed within proximity of constituent geometric elements 901 and 909. Similarly to localized blockage 1161, localized blockage 1181 includes at least one place-holding geometric element that is "detached" from boundary 917. As such, localized blockage 1181 is not actually manufactured, but merely included as part of design 1180 to prevent potential problematic layout patter 921 from becoming, for example, actual problematic layout pattern 953. Localized blockage 1181 may be determined based on at least a portion of actual problematic layout pattern 953 that is not exhibited by design 900, but should be avoided when design 900 and, thereby design 1180, is modularly integrated as part of another IC design. In this instance, however, localized blockage 1181 may be constrained to at least a portion of the vicinity where associated actual problematic layout pattern 953 would result in at least one manufacturing issue. As such, localized blockage 1181 may be dimensionally smaller than localized blockage 1161 and, thereby, configured to maximize available routing and placement space for other geometric elements, but configured to at least ensure potential problematic layout pattern 921 does not become, for example, actual problematic layout pattern 953.

Adverting again to FIG. 10, process 119 may store, per step 1005, at least one modified version of physical IC block layout pattern 900 to, for instance, repository 111. For example, modified layout patterns 1100, 1120, 1140, 1160, and/or 1180 may be stored to repository 111.

Figure 12:
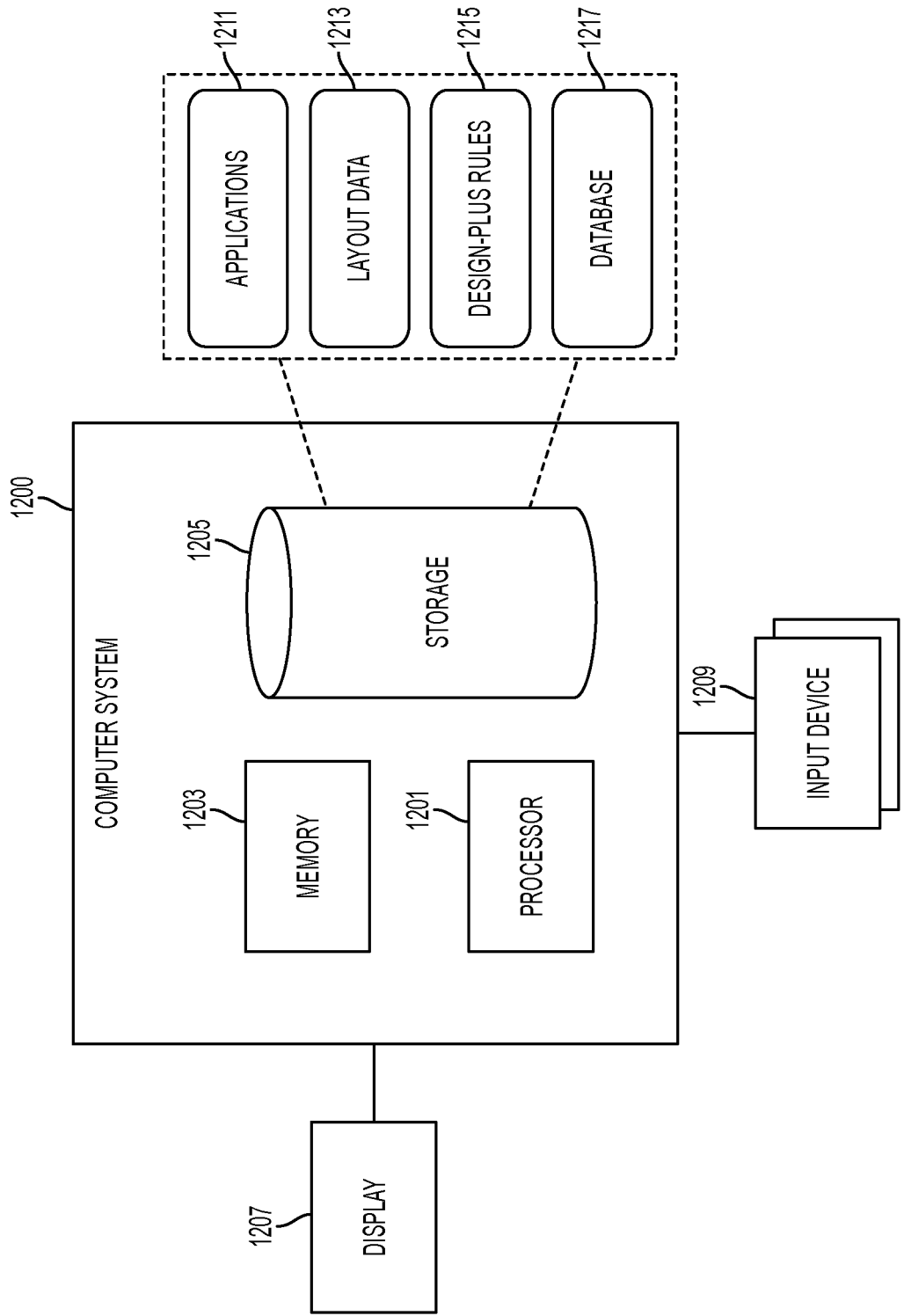
FIG. 12 schematically illustrates a computer system, according to an exemplary embodiment.

The processes described herein may be implemented via software, hardware, firmware, or a combination thereof. Exemplary hardware (e.g., computing hardware) is schematically illustrated in FIG. 12. As shown, computer system 1200 includes at least one processor 1201, at least one memory 1203, and at least one storage 1205. Computer system 1200 may be coupled to display 1207 and one or more input devices 1209, such as a keyboard and a pointing device. Display 1207 may be utilized to provide one or more GUI interfaces, such as one or more design verification plus interfaces. Input devices 1209 may be utilized by users of computer system 1200 to interact with, for instance, the GUI interfaces. Storage 1205 may store applications 1211, layout data (or information) 1213, design plus rules 1215, and at least one database (or repository) 1217. Applications 1211 may include instructions (or computer program code) that when executed by processor 1201 cause computer system 1200 to perform one or more processes, such as one or more of the processes described herein. In exemplary embodiments, applications 1211 may include one or more EDA tools, such as one or more design verification plus tools, which may be utilized to generate one or more design verification plus rules for identifying and handling actual and/or problematic layout patterns within physical IC block layout patterns that cause, at least in part, hotspots when fabricated in association with one or more IC manufacturing processes. According to other embodiments, applications 1211 may include or more EDA tools, such as one or more design verification tools, which may modify physical IC block layout patterns including one or more identified potential problematic layout patterns to remove identified potentially problematic layout patterns or "halo" at least a portion of identified potentially problematic layout patterns with one or more localized blockages.

Embodiments of the present disclosure can achieve several technical effects, such as being quickly and efficiently enforceable, and providing pass/no-pass criteria. It also provides simple documentation within design manuals, it is not as computationally intensive as rules-based or simulation-based approaches, and it does not require highly-accurate manufacturability models, such as lithographic or other manufacturing-based models, that may not be available during design verification processes. This enables embodiments of the present disclosure to be applied early in the design flow, as well as enforced in conjunction with other conventional design verification techniques, if desired. Furthermore, embodiments of the present disclosure also enable potential problematic layout patterns to be predicted, identified, and handled. This allows embodiments of the present disclosure to preemptively eliminate the possibility of future actual problematic layout patterns from being generated when a modular physical IC block design is incorporated as part of another physical IC design. As such, embodiments of the present disclosure enable faster design cycles, as well as more cost-effective approaches to design and design verification processes. The present disclosure enjoys industrial applicability in any of various types of highly integrated semiconductor devices, such as non-volatile memory devices, particularly sub-30 nm devices.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
receiving data corresponding to one or more problematic layout patterns associated with an integrated circuit manufacturing process;
receiving data corresponding to a block layout design of a modular component including a plurality of geometric elements and configured to be integrated with one or more integrated circuit designs;
scanning a boundary of the block layout design against the one or more problematic layout patterns, the boundary being an outer area of the block layout design configured to be adjacent to the one or more integrated circuit designs;
identifying, at the boundary, one or more partial matches of the one or more problematic layout patterns;
generating results indicating the one or more partial matches; and
modifying the layout design based on the results, wherein modifying the layout design at least includes modifying the layout design to include at least one localized blockage around at least a portion of at least one of the one or more partial matches, and wherein, at the at least one localized blockage, routing and/or placement resources for other geometric elements are either reduced or made unavailable.

2. The method according to claim 1, wherein modifying the layout design at least includes:
modifying the layout design to remove at least one of the one or more partial matches.

3. The method according to claim 1, wherein the block including the modified layout design is configured as a modular component for integration as part of another integrated circuit design.

4. The method according to claim 1, furthering comprising:
identifying the one or more partial matches based on at least one pattern matching sensitivity parameter.

5. The method according to claim 1, wherein the one or more problematic layout patterns are associated with at least one yield and/or reliability detracting issue.

6. The method according to claim 1, wherein the integrated circuit manufacturing process includes at least one deposition-based, modification-based, patterning-based, or removal-based manufacturing process.

7. The method according to claim 6, wherein the integrated circuit manufacturing process includes photolithography and the layout design is utilized to fabricate a photolithographic mask.

8. An apparatus comprising:
at least one processor; and
at least one memory including computer program code, the at least one memory and the computer program code configured to, with the at least one processor, cause the apparatus to perform at least the following,
receive data corresponding to one or more problematic layout patterns associated with an integrated circuit manufacturing process,
receive data corresponding to a block layout design of a modular component including a plurality of geometric elements and configured to be integrated with one or more integrated circuit designs,
scan a boundary of the block layout design against the one or more problematic layout patterns, the boundary being an outer area of the block layout design configured to be adjacent to the one or more integrated circuit designs,
identify, at the boundary, one or more partial matches of the one or more problematic layout patterns,
generate results indicating the one or more partial matches, and
modify the layout design based on the results, wherein modifying the layout design at least includes modifying the layout design to include at least one localized blockage around at least a portion of at least one of the one or more partial matches, and wherein, at the at least one localized blockage, routing and/or placement resources for other geometric elements are either reduced or made unavailable.

9. The apparatus according to claim 8, wherein modifying the layout design at least includes:
modifying the layout design to remove at least one of the one or more partial matches.

10. The apparatus according to claim 8, wherein the block including the modified layout design is configured as a modular component for integration as part of another integrated circuit design.

11. The apparatus according to claim 8, wherein the apparatus is at least further caused to:
identify the one or more partial matches based on at least one pattern matching sensitivity parameter.

12. The apparatus according to claim 8, wherein the one or more problematic layout patterns are associated with at least one yield and/or reliability detracting issue.

13. The apparatus according to claim 8, wherein the integrated circuit manufacturing process includes at least one deposition-based, modification-based, patterning-based, or removal-based manufacturing process.

14. The apparatus according to claim 13, wherein the integrated circuit manufacturing process includes photolithography and the layout design is utilized to fabricate a photolithographic mask.

15. A method comprising:
receiving data corresponding to one or more problematic layout patterns associated with an integrated circuit (IC) manufacturing process;
receiving data corresponding to a block layout design of a modular component including a plurality of geometric elements and configured to be integrated with one or more integrated circuit designs;
scanning a boundary of the block layout design against the one or more problematic layout patterns to identify if there are any at least partial matches of the one or more problematic layout patterns at least at the boundary, the boundary being an outer area of the block layout design configured to be adjacent to the one or more integrated circuit designs;
generating results to indicate whether at least one or more partial matches exist;
generating an output layout design;
forming an IC design including the output layout design;
fabricating a photolithographic mask patterned with the IC design; and
patterning an IC chip using the photolithographic mask,
wherein generating an output layout design further comprises modifying the layout design to include at least one localized blockage around at least a portion of at least one of the one or more partial matches, and wherein, at the at least one localized blockage, routing and/or placement resources for other geometric elements are either reduced or made unavailable.

16. The method according to claim 15, wherein:
modifying the layout design to remove at least one of the one or more partial matches.

* * * * *